US011415554B2

(12) United States Patent
Nara

(10) Patent No.: US 11,415,554 B2
(45) Date of Patent: Aug. 16, 2022

(54) ULTRASONIC INSPECTION METHOD

(71) Applicant: YAMAHA FINE TECHNOLOGIES CO., LTD., Hamamatsu (JP)

(72) Inventor: Akihiro Nara, Hamamatsu (JP)

(73) Assignee: YAMAHA FINE TECHNOLOGIES CO., LTD., Hamamatsu (JP)

(*) Notice: Subject to any disclaimer, the term of this patent is extended or adjusted under 35 U.S.C. 154(b) by 0 days.

(21) Appl. No.: 17/073,597

(22) Filed: Oct. 19, 2020

(65) Prior Publication Data

US 2021/0048412 A1 Feb. 18, 2021

Related U.S. Application Data

(60) Division of application No. 16/016,846, filed on Jun. 25, 2018, now abandoned, which is a continuation of (Continued)

(30) Foreign Application Priority Data

Jan. 5, 2016 (JP) .............................. JP2016-000750

(51) Int. Cl.
*G01N 29/04* (2006.01)
*G01N 29/48* (2006.01)
(Continued)

(52) U.S. Cl.
CPC ........... *G01N 29/043* (2013.01); *G01N 29/11* (2013.01); *G01N 29/265* (2013.01); *G01N 29/32* (2013.01);
(Continued)

(58) Field of Classification Search
CPC .... G01N 29/043; G01N 29/069; G01N 29/07; G01N 29/262; G01N 29/04; G01N 29/24;
(Continued)

(56) References Cited

U.S. PATENT DOCUMENTS 3,885,419 A 5/1975 Witte
3,981,184 A 9/1976 Matay
(Continued)

FOREIGN PATENT DOCUMENTS

CN 104487838 A 4/2015
JP 2000241397 A 9/2000
(Continued)

OTHER PUBLICATIONS

International Search Report issued in Intl. Appln. No. PCT/JP2016/088864 dated Mar. 28, 2017. English translation provided.
(Continued)

*Primary Examiner* — Helen C Kwok
(74) *Attorney, Agent, or Firm* — Rossi, Kimms & McDowell LLP

(57) ABSTRACT

An ultrasonic inspection method that includes arranging an ultrasonic transmission element and an ultrasonic reception element symmetrically in relation to a straight line in a diameter direction orthogonal to the cylinder axis of a cylindrical inspection object, the inspection object being interposed between the ultrasonic transmission element and the ultrasonic reception element; transmitting ultrasonic waves from the ultrasonic transmission element at a plurality of positions in the diameter direction; receiving by the ultrasonic reception element the ultrasonic waves transmitted from the ultrasonic transmission element and transmitted through the inspection object by propagating through the inside of the inspection object; and inspecting the inspection object on the basis of a reception signal of the ultrasonic waves received by the ultrasonic reception element.

4 Claims, 17 Drawing Sheets

Related U.S. Application Data application No. PCT/JP2016/088864, filed on Dec. 27, 2016.

(51) Int. Cl.
  *G01N 29/34* (2006.01)
  *G01N 29/11* (2006.01)
  *G01N 29/44* (2006.01)
  *G01N 29/265* (2006.01)
  *G01N 29/32* (2006.01)
  *G01N 29/38* (2006.01)

(52) U.S. Cl.
  CPC ........... *G01N 29/343* (2013.01); *G01N 29/38* (2013.01); *G01N 29/4427* (2013.01); *G01N 29/48* (2013.01); *G01N 2291/015* (2013.01); *G01N 2291/042* (2013.01); *G01N 2291/0425* (2013.01); *G01N 2291/2634* (2013.01)

(58) Field of Classification Search
  CPC ............. G01N 29/12; G01N 2291/044; G01N 29/265; G01N 29/32; G01N 29/343; G01N 29/38; G01N 29/4427; G01N 29/48; G01N 29/11
  See application file for complete search history.

(56) References Cited

U.S. PATENT DOCUMENTS

| | | | |
|---|---|---|---|
| 4,412,453 A | 11/1983 | Nagai | |
| 4,730,493 A | 3/1988 | Lebaud | |
| 5,113,697 A | 5/1992 | Schlawne | |
| 6,401,538 B1 | 6/2002 | Han | |
| 7,363,817 B2 | 4/2008 | Bond | |
| 7,395,711 B2 | 7/2008 | Greenwood | |
| 8,381,592 B2 | 2/2013 | Cawley | |
| 8,590,381 B2 | 11/2013 | Murai | |
| 10,317,262 B2 | 6/2019 | Kippersund | |
| 2004/0123666 A1 | 7/2004 | Ao | |
| 2006/0201252 A1 | 9/2006 | Georgeson | |
| 2006/0266119 A1 | 11/2006 | Cobb | |
| 2009/0031813 A1 | 2/2009 | Miki | |
| 2011/0137588 A1 | 6/2011 | Walker | |
| 2011/0226063 A1 | 9/2011 | Gysling | |
| 2014/0202249 A1 | 7/2014 | Luo | |
| 2014/0216158 A1* | 8/2014 | Sanabria Martin | G01N 29/06 73/588 |
| 2015/0198565 A1 | 7/2015 | Chatellier | |
| 2016/0061778 A1 | 3/2016 | Kishiro | |
| 2017/0328869 A1* | 11/2017 | Miki | G01N 29/223 |
| 2018/0321193 A1 | 11/2018 | Nara | |

FOREIGN PATENT DOCUMENTS

| | | | | |
|---|---|---|---|---|
| JP | 2009515158 A | | 4/2009 | |
| JP | 2010025817 A | | 2/2010 | |
| JP | 2008-139325 | * | 12/2010 | |
| JP | 2012-127832 | * | 7/2012 | |
| JP | 2012141230 A | | 7/2012 | |
| JP | 2019-132796 | * | 10/2020 | G01N 29/34 |
| KR | 1020060129711 A | | 12/2006 | |
| WO | 2009122904 A1 | | 7/2011 | |
| WO | 2015096902 A1 | | 7/2015 | |
| WO | 2017119359 A1 | | 7/2017 | |

OTHER PUBLICATIONS

Written Opinion issued in Intl. Appln. No. PCT/JP2016/088864 dated Mar. 28, 2017.
Nishino et al. "A novel method of defect detection in a pipe using overlapped turnaround C-Lamb waves generated by noncontact air-coupled ultrasonic sensors." Heisei 20 Nendo Shunki Taikai Koen Gaiyosyu. May 20, 2008: 9-12. English translation provided.
Kawashima, "Nondestructive material evaluation and inspection by airborne propagation ultrasonic method", Setsuya Abe The Japanese Society for Non-Destructive Inspection. Jul. 2009. vol. 58. Partial English translation provided.
Office Action issued in Japanese Patent Application No. 2019-054687 dated Jun. 18, 2019. English translation provided.
Office Action issued in Chinese Appln. No. 201680076989.1 dated Apr. 16, 2020. English translation provided.
Office Action issued in U.S. Appl. No. 16/016,846 dated Apr. 9, 2020.
Office Action issued in U.S. Appl. No. 16/016,846 dated Aug. 13, 2020.

* cited by examiner

ULTRASONIC INSPECTION METHOD

PRIORITY CLAIM

This application is a Divisional of U.S. patent application Ser. No. 16/016,846 filed on Jun. 25, 2018, which is continuation application of a PCT Application No. PCT/JP2016/088864, filed on Dec. 27, 2016, entitled "ULTRASONIC INSPECTION METHOD" whose priority is claimed on Japanese Patent Application No. 2016-000750, filed on Jan. 5, 2016. The description thereof is incorporated herein by reference.

BACKGROUND OF THE INVENTION

Field of the Invention

The present invention relates to a method of ultrasonically inspecting the inside of a cylindrical inspection object.

Description of Related Art

When ultrasonically inspecting the inside of an inspection object having a cylindrical shape such as a tube or cylinder, it is necessary to perform adjustment so as to make ultrasonic waves incident on the inspection object at the angle that excites guided waves (shear waves or plate waves that propagate in an object having a boundary surface such as a pipe or plate) and receive, on the reception side, the ultrasonic waves that have transmitted through the inside of the inspection object at the angle of opposite direction and the same magnitude as the angle exciting the guided waves.

For example, Japanese Unexamined Patent Application, Publication No. 2010-25817 (JP-A 2010-25817) discloses a tube ultrasonic flaw detection method in which a transmission ultrasonic probe and a reception ultrasonic probe separated are arranged from each other on the circumference of a pipe to be inspected. The inclination direction of the angle of incidence of the transmission ultrasonic probe with respect to the normal of the outer peripheral surface of the pipe to be inspected and the inclination direction of the reception ultrasonic probe with respect to the normal of the outer peripheral surface are set to be mutually opposite directions. In this method, ultrasonic pulses output from the transmission ultrasonic probe propagate in the pipe to be inspected in the guided wave propagation mode. When the ultrasonic pulses make contact with a defect, the attitude of the reception ultrasonic probe with respect to the external surface is set so as to be able to detect a defect echo arising from this defect that propagates in the reverse direction to the ultrasonic pulses in the guided wave propagation mode.

In the ultrasonic flaw detection method disclosed in JP-A 2010-25817, it is necessary to set the positions of the ultrasonic probes with respect to the inspection object so that the angle of incidence of the ultrasonic waves is a specified angle (the angle that excites guided waves). Therefore, when the outer diameter of the inspection object changes, it is necessary to adjust the angle of incidence of the ultrasonic waves corresponding to the outer diameter of the inspection object. In this case, when the speed of sound (sound speed) transmitted within the inside of the material of the inspection object is known in advance, it is possible to calculate a suitable angle of incidence. However, when the inspection object consists of a laminate material or consists of a material with unknown sound speed data, it is difficult to calculate a suitable angle of incidence. Moreover, when the outer shape of the inspection object changes midway in the lengthwise direction the cylindrical inspection object to assume a tapered tube shape, adjustment of the angle of incidence is difficult.

SUMMARY OF THE INVENTION

The present invention was achieved in view of the above circumstances and has as its object to provide an ultrasonic inspection method that eliminates the troublesome work of adjustment the angle of incidence with respect to a cylindrical inspection object, and can easily perform inspection even when the sound speed data of the material of an inspection object is unknown and when the inspection object consists of a laminate material, or in the case of an inspection object in which the diameter changes midway in the lengthwise direction.

An ultrasonic inspection method of the present invention includes: arranging an ultrasonic transmission element and an ultrasonic reception element symmetrically in relation to a straight line in a diameter direction orthogonal to the cylinder axis of a cylindrical inspection object, the inspection object being interposed between the ultrasonic transmission element and the ultrasonic reception element; transmitting ultrasonic waves from the ultrasonic transmission element at a plurality of positions in the diameter direction; receiving by the ultrasonic reception element the ultrasonic waves transmitted from the ultrasonic transmission element and transmitted through the inspection object by propagating through the inside of the inspection object; and inspecting the inspection object on the basis of a reception signal of the ultrasonic waves received by the ultrasonic reception element.

In the ultrasonic inspection method of the present invention, the ultrasonic transmission element and the ultrasonic reception element may be moved in the diameter direction of the inspection object in an opposed state with the inspection object interposed therebetween.

In the ultrasonic inspection method of the present invention, a plurality of the ultrasonic transmission elements and a plurality of the ultrasonic reception elements may be arranged opposite each other in a direction parallel with the direction orthogonal to the cylinder axis direction of a cylindrical inspection object, with the inspection object interposed therebetween, ultrasonic waves may be transmitted from the ultrasonic transmission elements to the inspection object, and the inspection object may be inspected on the basis of a reception signal of ultrasonic waves received by the ultrasonic reception elements.

In the ultrasonic inspection method of the present invention, facing the cylindrical inspection object, either one of the ultrasonic transmission element that transmits ultrasonic waves in a direction parallel with the direction orthogonal to the axial direction of this inspection object, and the ultrasonic reception element arranged on the opposite side of the ultrasonic transmission element with the inspection object interposed therebetween and capable of receiving the ultrasonic waves transmitted from the ultrasonic transmission element may be arranged side by side in a plurality parallel to the diameter direction of the inspection object, which is orthogonal to the transmission direction of the ultrasonic transmission element, and while moving the other along the diameter direction, ultrasonic waves may be transmitted from the ultrasonic transmission element, and the inspection object may be inspected on the basis of a reception signal of the ultrasonic waves received by the ultrasonic reception element.

In the ultrasonic inspection method of the present invention, a reception signal of ultrasonic waves that falls in the range of a time window provided before the arrival time of the ultrasonic waves to the ultrasonic reception element when there is no inspection object between the ultrasonic reception element and the ultrasonic transmission element may be analyzed as a first ultrasonic signal, and the inspection object may be inspected on the basis of the analysis result of the first ultrasonic signal.

In the ultrasonic inspection method of the present invention, a determination may be performed whether, prior to receiving by the ultrasonic reception element ultrasonic waves that propagated via the outer side the inspection object, a first ultrasonic signal that reached the ultrasonic reception element was detected, and the inspection object may be inspected on the basis of the detection result of this first ultrasonic signal.

In the ultrasonic inspection method of the present invention, a shield may be provided between the ultrasonic transmission element and the ultrasonic reception element so as to block ultrasonic waves from reaching the ultrasonic reception element from the ultrasonic transmission element through the space outside the inspection object.

EMBODIMENTS FOR CARRYING OUT THE INVENTION

Figure 1:
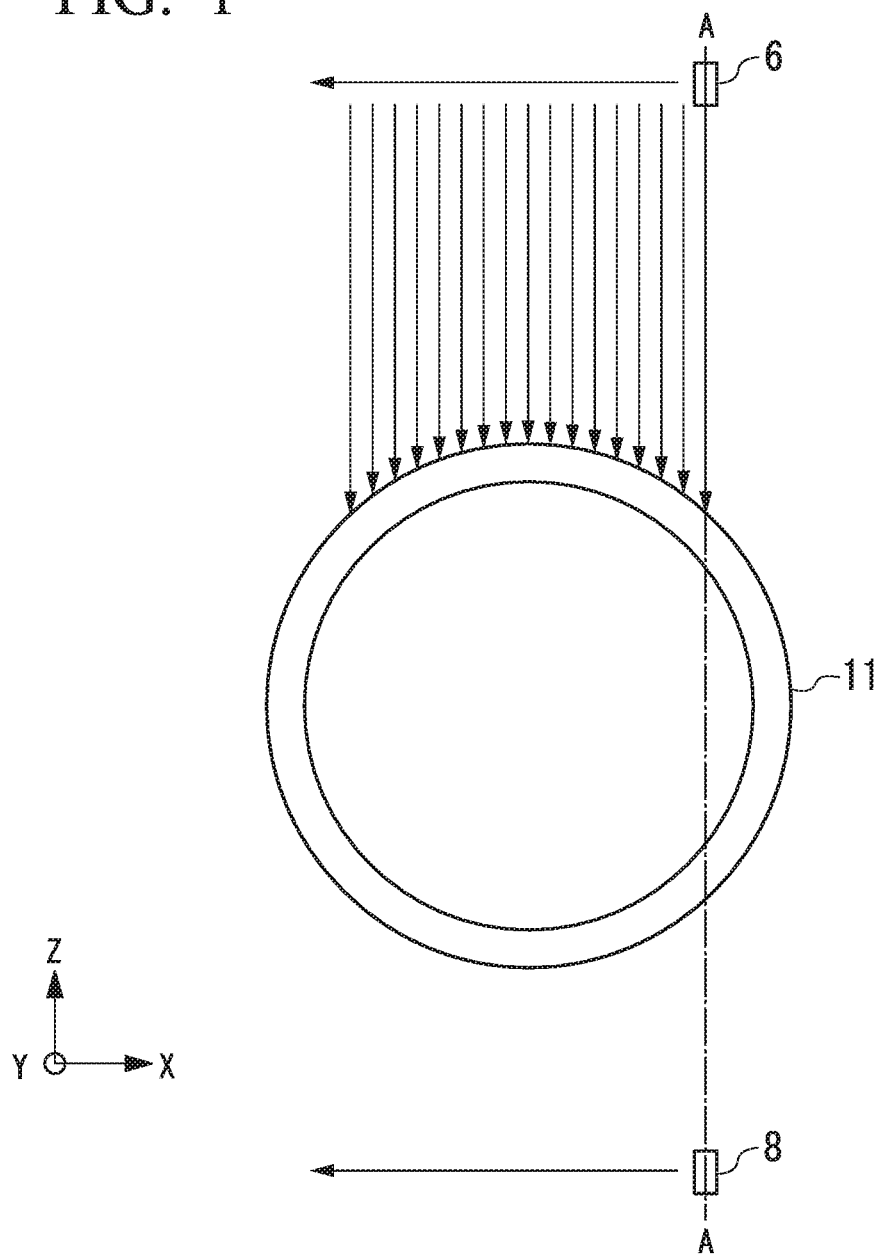
FIG. 1 is a cross-sectional view showing the ultrasonic inspection method of the first embodiment of the present invention.

Hereinbelow, embodiments of the present invention will be described referring to the drawings.

First Embodiment

[Ultrasonic Inspection Device]

Figure 9:
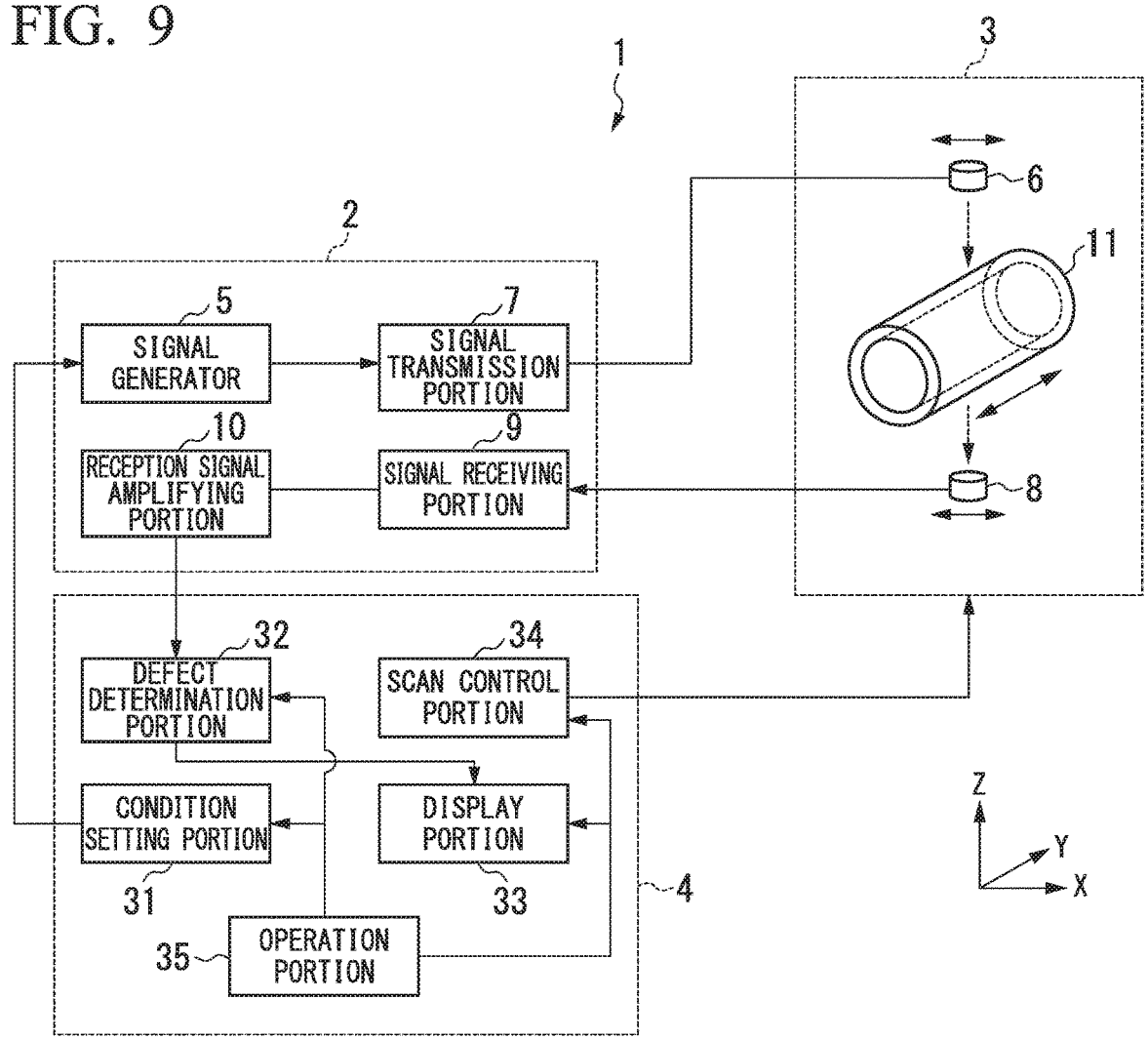
FIG. 9 is a block drawing showing the ultrasonic inspection device used in the ultrasonic inspection method of the first embodiment of the present invention.

First, the ultrasonic inspection device used in the ultrasonic inspection method of the first embodiment of the present invention will be described. This ultrasonic inspection device 1, as shown in FIG. 9, has a pulser/receiver portion 2, a probe portion 3, and a signal processing portion 4.

The pulser/receiver portion 2 is constituted from a signal generator 5 that generates an ultrasonic drive signal, a signal transmission portion 7 that transmits the generated ultrasonic drive signal to the ultrasonic transmission element 6, a signal receiving portion 9 that receives the signal from the ultrasonic reception element 8, and a reception signal amplifying portion 10 that amplifies the received signal.

The probe portion 3 has the ultrasonic transmission element 6 that transmits ultrasonic waves toward the inspection object 11 with the ultrasonic drive signal transmitted from the signal transmission portion 7, and the ultrasonic reception element 8 that receives the ultrasonic waves propagated and transmitted through the inspection object 11 and sends the ultrasonic waves to the signal receiving portion 9 as a received voltage signal. The ultrasonic transmission element 6 and the ultrasonic reception element 8 each are preferably a point-focus type probe that allow ultrasonic beam point focused. The ultrasonic transmission element 6 and the ultrasonic reception element 8 each have internally an ultrasonic vibrating element (not illustrated) consisting a piezoelectric element. The ultrasonic transmission element 6 transmits ultrasonic waves from the vibrating element in accordance with an input voltage signal, and the ultrasonic reception element 8 converts the received ultrasonic waves to a voltage signal by the vibrator and outputs the voltage signal.

The ultrasonic transmission element 6 and the ultrasonic reception element 8 are held in an opposed state in the Z-axis direction by a frame member not illustrated. The inspection object 11 is arranged between the ultrasonic transmission element 6 and the ultrasonic reception element 8 so that the cylinder axis of the inspection object 11 extending in the Y-axis direction is orthogonal to the Z-axis direction, facing direction of the ultrasonic transmission element 6 and the ultrasonic reception element 8. Moreover, the inspection object 11 is arranged so that the diameter of the circular-shape cross section orthogonal to the cylinder axis is directed to the X-axis direction that is orthogonal to the Y axis and the Z axis. Accordingly, the vibrator provided at the distal end of each of the ultrasonic transmission element 6 and the ultrasonic reception element 8 faces the inspection object 11. Moreover, the ultrasonic transmission element 6 and the ultrasonic reception element 8 are, in the Z-X planes, at symmetrical positions in relation to a straight line passing through the diameter extending in the X-axis direction of the inspection object 11.

The inspection object 11 undergoes ultrasonic inspection while moving the ultrasonic transmission element 6 and the ultrasonic reception element 8 with respect to the inspection object 11 in the X direction parallel with the diameter direction of the inspection object 11, the Y direction parallel with the cylinder axis direction of the inspection object 11, and the Z direction so that separating from or approaching the inspection object 11.

That is, as shown in FIG. 1, the inspection object 11 is arranged horizontally so that the cylinder axis is directed to the Y-axis direction. A diameter of the cylindrical cross section of the inspection object 11 and a straight line parallel with the diameter are directed to the X-axis direction. The vertical direction orthogonal with the X axis and Y axis is the Z-axis direction.

The ultrasonic transmission element 6 and the ultrasonic reception element 8 are individually moved so as to be mutually separated or brought closer together in the facing direction (Z-axis direction), but are moved together in the X-axis direction and Y-axis direction. Regarding movement in the X-axis direction and Y-axis direction, since it is required that the ultrasonic transmission element 6 and the ultrasonic reception element 8 relatively moves to the inspection object 11, the inspection object 11 may be moved in the X-axis direction and Y-axis direction.

The signal processing portion 4 is provided with a condition setting portion 31 that sets a condition for ultrasonic drive signal generation in the signal generator 5, a defect determination portion 32 that determines the existence of a defect in the inspection object 11 based on the received voltage signal from the signal receiving portion 9, a display portion 33 that displayed the received voltage signal and the like, a scan control portion 34 that controls the scan operation of the ultrasonic transmission element 6 and the ultrasonic reception element 8, and an operation portion 35 that inputs various control values to the condition setting portion 31, the defect determination portion 32, the display portion 33 and the scan control portion 34.

This signal processing portion 4 can be constituted with a personal computer or the like, and it is possible to provide a touch panel-type operation portion 35 on the screen of the display portion (monitor) 33, and set various conditions described below and control values such as position information with respect to the scan control portion 34 from the operation portion 35. Of course, a keyboard or the like may be used as the control portion 35.

[Ultrasonic Inspection Method]

The method of carrying out ultrasonic inspection of a cylindrical inspection object 11 with the ultrasonic inspection device 1 constituted in this way will be described.

Figure 3:
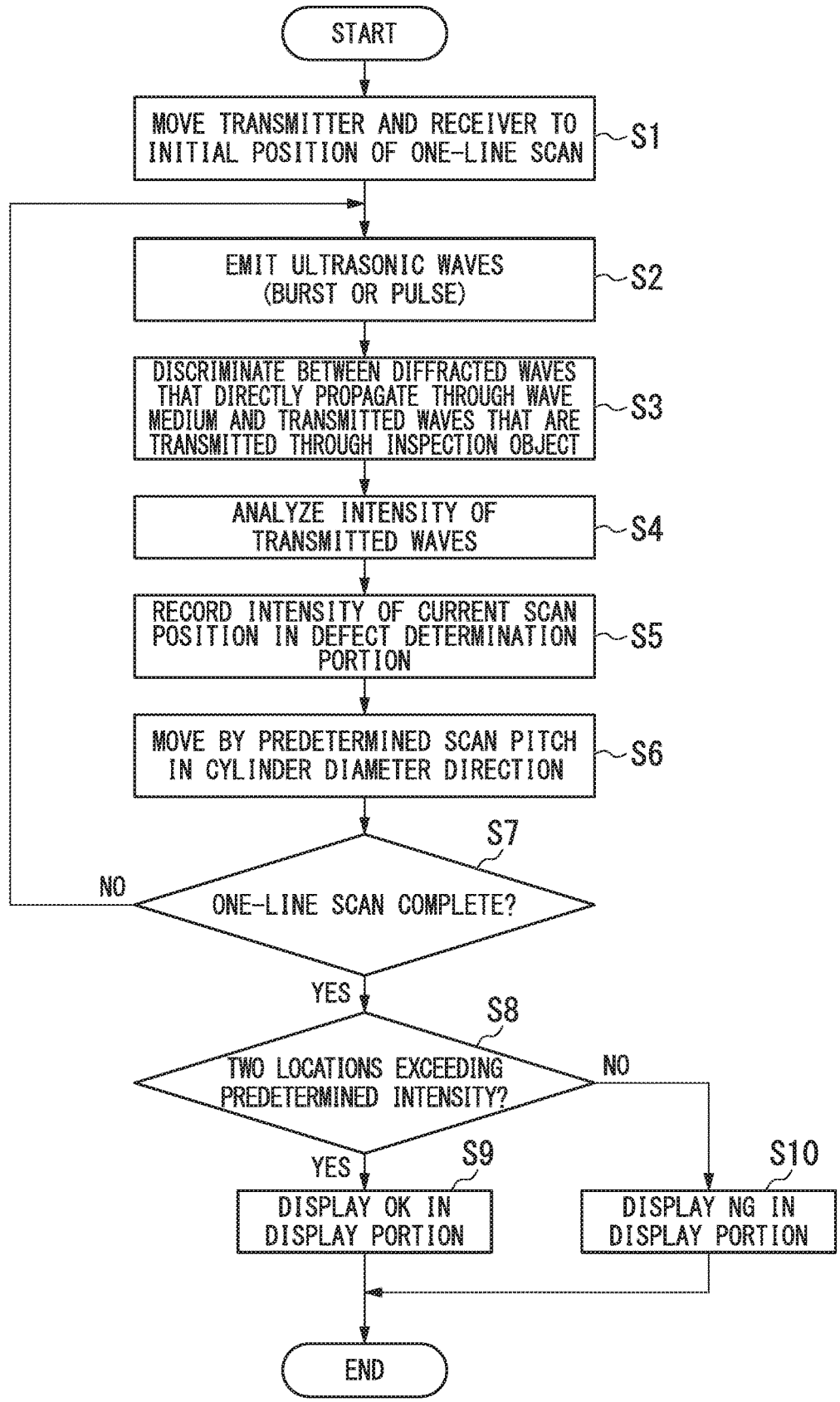
FIG. 3 is a flowchart that shows the ultrasonic inspection method of the first embodiment of the present invention.

The outline of the inspection method will be described in accordance with the flowchart of FIG. 3. The ultrasonic transmission element 6 and the ultrasonic reception element 8 are arranged in the initial position for starting a one-line scan, in the state of the ultrasonic transmission element 6 and the ultrasonic reception element 8 facing each other with the inspection object 11 interposed therebetween (S1). The initial position for starting the one-line scan is on the A-A line in FIG. 1, and movement along the diameter direction of the inspection object 11 as indicated by the leftward arrows of FIG. 1 is considered a one-line scan.

Next, burst- or pulse-type ultrasonic waves are transmitted from the ultrasonic transmission element 6 (S2). With respect to the ultrasonic waves that are received, the ultrasonic reception element 8 distinguishes between diffracted waves that directly propagate through a medium (air) in a manner wrapping around the inspection object, and transmitted waves that are transmitted through the inside of the inspection object 11 (S3). The intensity of the transmitted waves is analyzed (S4), and recorded at the current scan position in the defect determination portion 32 (S5). The specific method of distinguishing between diffracted waves and transmitted waves is described later.

While maintaining the opposed attitude of the ultrasonic transmission element 6 and the ultrasonic reception element 8, the ultrasonic transmission element 6 and the ultrasonic reception element 8 are moved at a predetermined scan pitch in the cylinder diameter direction (X-axis direction) of the inspection object 11 (S6). This is repeated until the one-line scan is completed. When it is determined that the one-line scan has ended (S7), a determination is made as to whether or not in the one-line scan there exist two locations at which an ultrasonic signal exceeding a predetermined intensity was detected (S8). In the case of two locations being recognized at which an ultrasonic signal exceeding a predetermined intensity was detected (the determination of S8 being YES), "OK" is displayed in the display unit 33 (S9). In the case of two locations not being recognized (determination of S8 being NO), "NG" is displayed in the display unit 33 (S10), and the process is completed.

Next, the ultrasonic wave propagation mode and the method of distinguishing ultrasonic waves in this inspection method will be described in detail.

The ultrasonic transmission element 6 and the ultrasonic reception element 8 are arranged at opposed positions symmetrically about a straight line passing through the X-axis direction diameter of the inspection object 11 orthogonal to the cylinder axis of the inspection object 11, the inspection object 11 being interposed between the ultrasonic transmission element 6 and the ultrasonic reception element 8. The initial position of one line scan of the ultrasonic transmission element 6 and the ultrasonic reception element 8 is indicated at A-A in FIG. 1. The ultrasonic transmission element 6 and the ultrasonic reception element 8 are maintained in the opposed state, and the ultrasonic transmission element 6 transmits burst-type or pulse-type ultrasonic waves to the inspection object 11. The intensity of the ultrasonic waves propagating along the cylindrical circumferential direction through the inside of the inspection object 11 is extremely small. Therefore, when ultrasonic waves transmitted from the ultrasonic transmission element 6 have reached the inspection object 11 at an angle other than the angle that excites guided waves within the inspection object 11, such waves may be regarded as having not been received by the ultrasonic reception element 8 as an ultrasonic signal propagating through the inside of the inspection object 11.

While moving the ultrasonic transmission element 6 and the ultrasonic reception element 8, in the opposed state, from the initial position shown at A-A in FIG. 1 in the diameter direction (X-axis direction) of the inspection object 11 orthogonal to the direction of opposition, ultrasonic waves are transmitted from the ultrasonic transmission element 6 as indicated by the arrows. By this movement, with regard to the ultrasonic waves that are transmitted from the ultrasonic transmission element 6 and that reach the inspection object 11, the angle of the transmission direction with respect to the surface of the inspection object 11 gradually changes. When the angle of the transmission direction of the ultrasonic waves transmitted from the ultrasonic transmission element 6 with respect to the inspection object 11 becomes the angle that excites guided waves in the inside of the inspection object 11, the incident ultrasonic waves are converted to guided waves in the inspection object 11 and are transmitted through the inspection object 11, propagating in the circumferential direction. For example, in the case of the inspection object 11 being a steel cylinder, the critical angle at which the angle of refraction exceeds 90° is around 3.3°, in consideration of the incidence from air. Therefore, by scanning beyond the position at which the angle of incidence becomes approximately 3.3°, it is possible to cover the entirety of the angle range having the possibility of ultrasonic waves being converted to guided waves and propagating within the inspection object 11.

When ultrasonic waves transmitted from the ultrasonic transmission element 6 are transmitted and propagate through the inside of the inspection object 11 as guided waves in this manner, the ultrasonic reception element 8 moves in synchronization, with the attitude opposing the ultrasonic transmission element 6 being maintained. Accordingly, the reception direction of the ultrasonic reception element 8 comes to be opposed at an opposite attitude of the same magnitude as the ultrasonic transmission element 6, with respect to the inspection object 11. For this reason, the ultrasonic reception element 8 receives the ultrasonic waves that have propagated through the inside of the inspection object 11 as the guided waves and, thereafter, are output from the surface of the inspection object 11.

Figure 2:
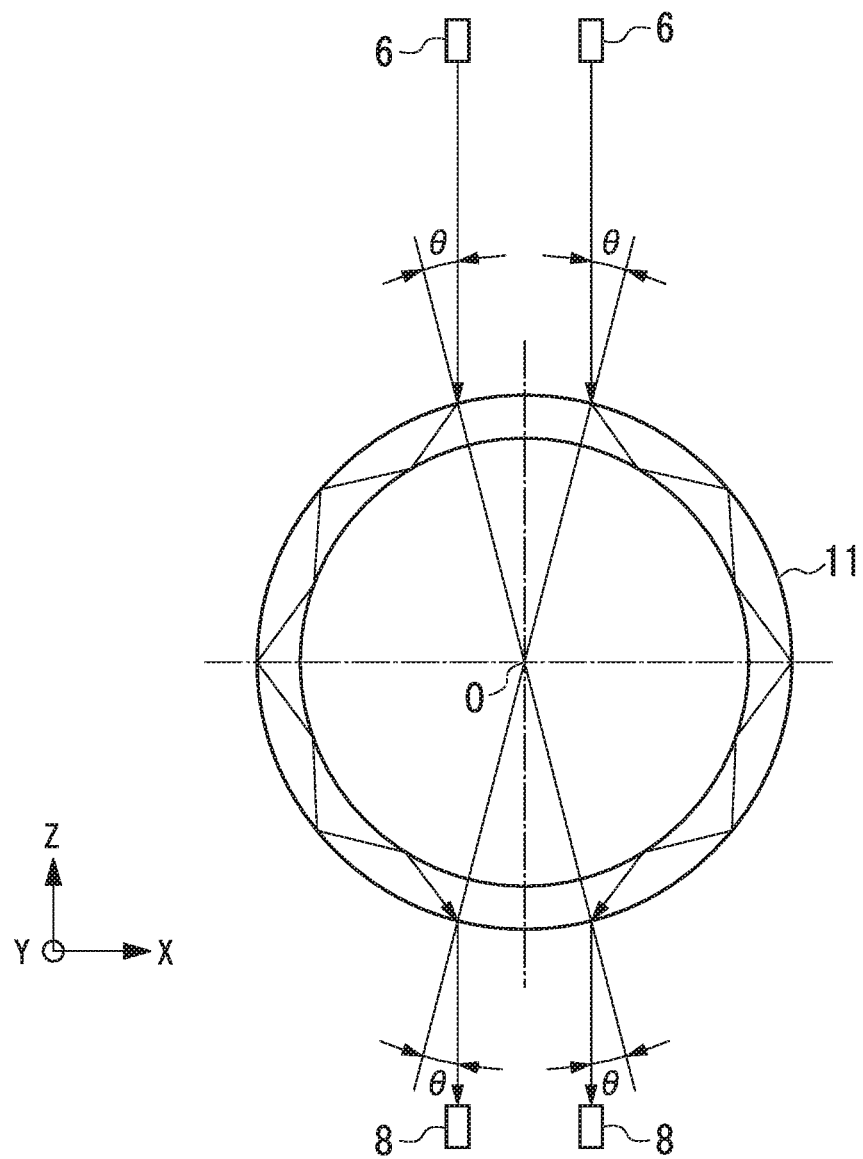
FIG. 2 is a cross-sectional view showing the state of transmitting and receiving ultrasonic waves at an angle that excites guided waves in the ultrasonic inspection method shown in FIG. 1.

FIG. 2 shows this state in a schematic manner. The ultrasonic waves from the ultrasonic transmission element 6 are incident at angle θ at which guided waves are excited in the inspection object 11. The ultrasonic waves are transmitted through the inside of the inspection object 11 and propagate in the circumferential direction, and are received at the ultrasonic reception element 8 at the angle θ of the same magnitude and opposite direction. In the case of the inspection object being made of steel as mentioned above, the ultrasonic waves made incident at that angle of incidence θ are, after propagating a half circumference in the inspection object 11, received at the opposing ultrasonic reception element 8.

When the inspection object 11 is scanned in the diameter direction by the ultrasonic transmission element 6 and the ultrasonic reception element 8, as shown in FIG. 2, there are positions at which the ultrasonic waves from the ultrasonic transmission element 6 are made incident at angle θ and the ultrasonic waves are received by the ultrasonic reception element 8 at the same angle θ after propagating in the inspection object 11 in its circumferential direction. At the angle θ, the guided waves are excited in the inspection object 11. During the scanning of the inspection object 11, such positions appear on the right and left sides of the inspection object 11.

Accordingly, by scanning the inspection object 11 in the diameter direction with the ultrasonic transmission element 6 and the ultrasonic reception element 8, it is possible to receive the ultrasonic waves that have propagated through the inside of the inspection object 11 at two locations on the left and right (the positions indicated in FIG. 2).

By making ultrasonic waves incident at an angle that excites the guided waves to the inside of the inspection object 11 as described above, the ultrasonic waves propagate through the inside of the inspection object 11 so as to be converted into the guided waves and, thereafter, are output from the surface of the inspection object 11 at the angle of the same magnitude and opposite direction as the angle θ of incidence of the inspection object 11. Accordingly, it is possible to receive ultrasonic waves that have propagated through the inside of the inspection object 11 by arranging the ultrasonic reception element 8 in an opposed state to the ultrasonic transmission element 6 that makes ultrasonic waves incident at an angle θ that excites guided waves in the inspection object 11, with the inspection object 11 being interposed between the ultrasonic transmission element 6 and the ultrasonic reception element 8.

Note that the ultrasonic waves received by the ultrasonic reception element 8 are not only ultrasonic waves that have propagated through the inside of the inspection object 11, but also ultrasonic waves that have directly arrived through the medium (air) on the outside of the inspection object 11. The former are transmitted waves, and the latter are diffracted waves.

Among ultrasonic waves, the sound speed of the transmitted waves that have propagated through the inside of the inspection object 11 is remarkably fast compared to the diffracted waves that propagate through the air via the outer side of the inspection object 11. Accordingly, the transmitted waves (the ultrasonic waves that have propagated through the inside of the inspection object 11) arrive first, and the diffracted waves (the ultrasonic waves that have propagated through the air) arrive afterward.

Figure 4:
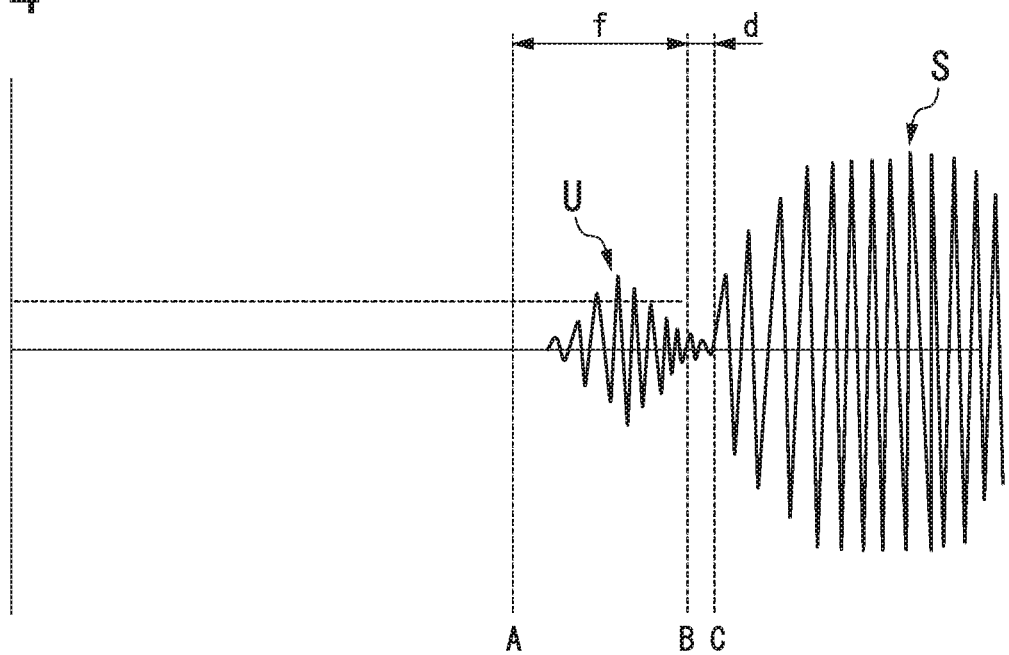
FIG. 4 is a waveform graph showing the signals received in the ultrasonic inspection method of the first embodiment, being a graph that shows the first method of setting a time window for detecting an ultrasonic signal by transmitted waves that have propagated through the inspection object.

Graphing the signals of these received ultrasonic waves as a time waveform results in FIG. 4. In FIG. 4, the horizontal axis denotes time, while the vertical axis denotes signal intensity (amplitude). At the ultrasonic reception element 8, a first ultrasonic signal U consisting of the transmitted waves that have propagated through the inside of the inspection object 11 arrives, then a second ultrasonic signal S consisting of the diffracted waves that have propagated through the air arrives subsequently. Therefore, by distinguishing between these signals U and S in the time domain, when the first ultrasonic signal U is detected, that signal can be identified as the ultrasonic signal that is obtained by propagating through the inside of the inspection object 11. When the intensity (amplitude) of this first ultrasonic signal is low, it is possible to determine that a defect exists in the inspection object 11.

That is, it is determined whether or not the intensity (amplitude) of the first ultrasonic signal U received prior to the second ultrasonic signal S is equal to or greater than a predetermined value. When equal to or a greater than the predetermined value, it is determined that the inspection object 11 is normal, and when less than the predetermined value, it is determined that a defect exists in the inspection object 11.

The method of distinguishing between the ultrasonic signal S and the ultrasonic signal U will be described in specific terms.

Letting the transmission timing of burst- or pulse-type ultrasonic waves be 0 μsec, in the case of ultrasonic propagation when there is no inspection object 11 between the ultrasonic transmission element 6 and the ultrasonic reception element 8, the ultrasonic waves are received at the time of C=(distance [mm] between the ultrasonic transmission element and ultrasonic reception element)/(sound speed of air [m/s])×1000 μsec, since the ultrasonic waves pass through for example air as the medium. Therefore, as shown in FIG. 4, letting a time that is d μsec earlier than C be B μsec, and letting a time that is f μsec earlier than B be A μsec, a time window with the range of A μsec to B μsec is set. Let U be the ultrasonic signal that falls in this time window from A to B. For example, if C=125 μsec, by setting a time window in the manner of A=100 μsec, B=124 μsec (d=1 μsec, f=24 μsec) and letting the signal that enters this time window be the ultrasonic signal U, it is possible to distinguish between the ultrasonic signal S and the ultrasonic signal U.

Figure 5:
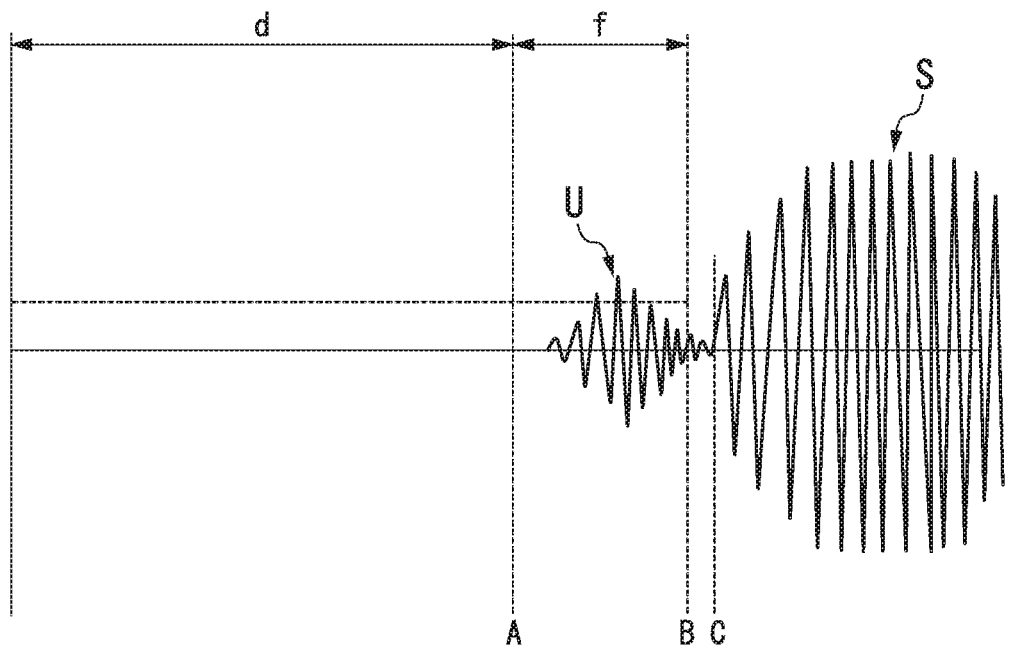
FIG. 5 is a waveform graph showing the signals received in the ultrasonic inspection method of the first embodiment, being a graph that shows the second method of setting a time window for detecting an ultrasonic signal by transmitted waves that have propagated through the inspection object.

It is also possible to set a time window of width f after a delay time d from 0 μsec, so that the time window comes at a time before C, as shown in FIG. 5.

Figure 6:
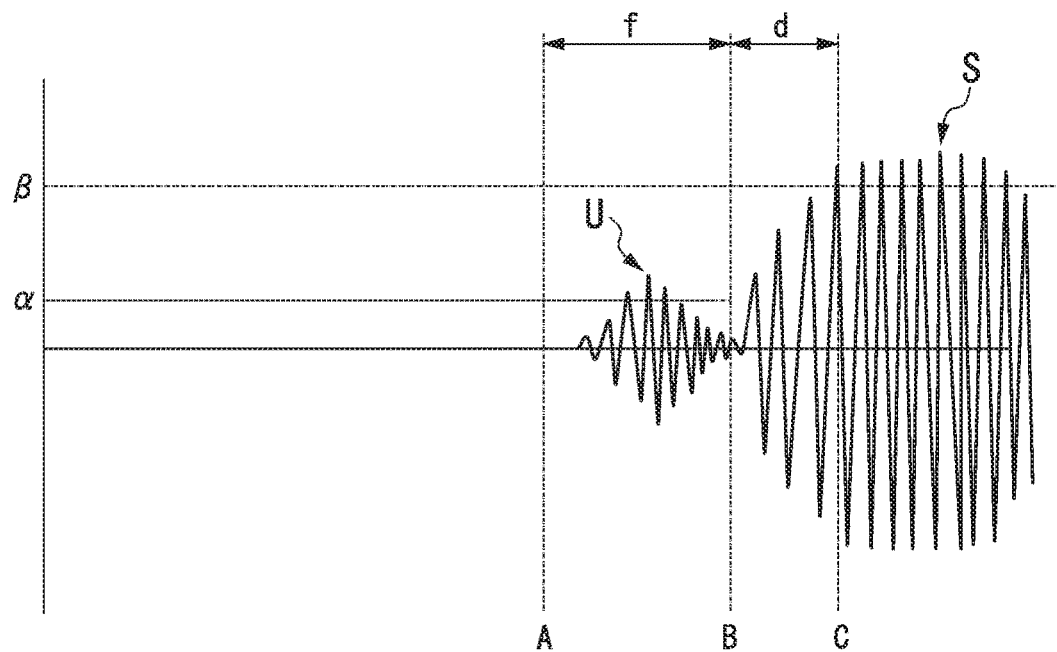
FIG. 6 is a waveform graph showing the signals received in the ultrasonic inspection method of the first embodiment, being a graph that shows the third method of setting a time window for detecting an ultrasonic signal by transmitted waves that have propagated through the inspection object.

In addition, yet another method is described in detail below for distinguishing between the ultrasonic signal S and the ultrasonic signal U, referring to FIG. 6.

The intensity (amplitude) of the transmitted waves (the ultrasonic waves that have propagated through the inside of the inspection object 11) is smaller than the diffracted waves (the ultrasonic waves that have propagated through the air). Therefore, two threshold values are set with regard to the intensity of ultrasonic signals—the first threshold value α, for the first ultrasonic signal U, that is used for determination of normality, and the second threshold value β, for the second ultrasonic signal S, that is greater than the first threshold value α. When the intensity of an ultrasonic signal received by the ultrasonic reception element 8 is equal to or greater than the first threshold value α, it is determined whether or not the intensity is equal to or greater than the second threshold value β. When it is determined that the intensity of the ultrasonic signal is equal to or greater than the second threshold value β, it is determined that the ultrasonic signal is the second ultrasonic signal S.

Then, it is determined whether or not the first ultrasonic signal U having a smaller intensity than the second ultrasonic signal S was received prior to the second ultrasonic signal S. That is, as shown in FIG. 6, when an ultrasonic signal less than the second threshold value β and equal to or greater than the first threshold value α is detected a predetermined time (5 μsec, for example) before the detection of a second ultrasonic signal S equal to or greater than the second threshold value β, it is determined to be the first ultrasonic signal U. When the first ultrasonic signal U has been detected, it is determined that the inspection object 11 is normal. When a first ultrasonic signal U equal to or greater than the first threshold value α is not detected before the second ultrasonic signal S, it is determined that the inspection object 11 has a defect or the inspection object 11 has not been inspected normally.

Figure 7:
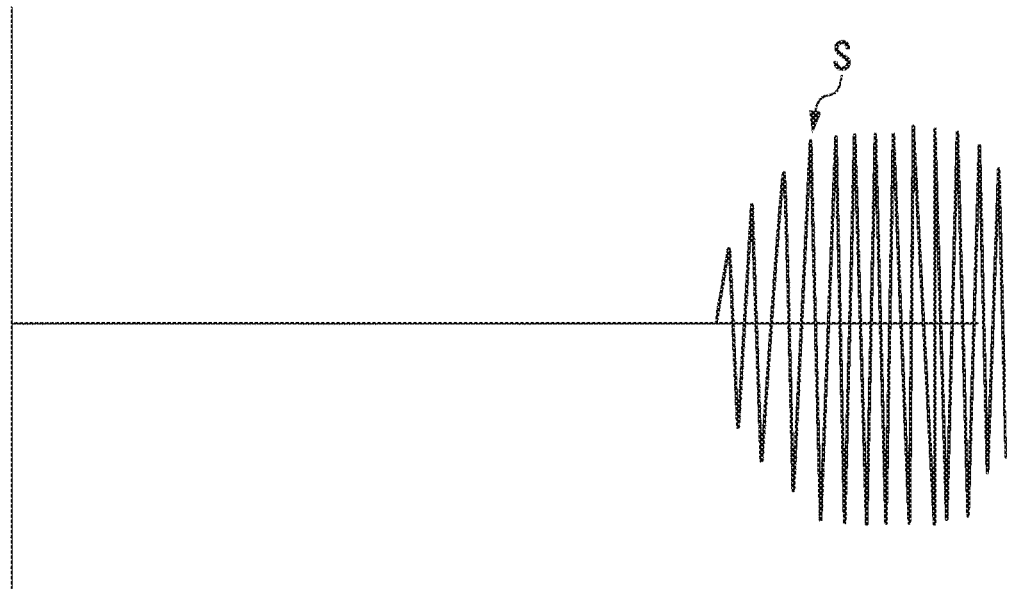
FIG. 7 is a waveform graph that shows the case of receiving only ultrasonic waves consisting of diffracted waves that have travelled via the outer side of the inspection object, without receiving ultrasonic waves consisting of transmitted waves that propagate through the inside of the inspection object, in the ultrasonic inspection method of the first embodiment.

As shown in FIG. 1 and FIG. 2, by scanning with the ultrasonic transmission element 6 and the ultrasonic reception element 8 in the diameter direction of the inspection object 11, the ultrasonic waves consisting of guided waves propagate through the inside of the inspection object 11 at two locations. When the inspection object 11 is normal, it is possible to detect the two types of ultrasonic signals U and S as shown in FIG. 4. On the other hand, at positions other than those two locations, since the transmission angle of the ultrasonic waves to the inspection object 11 is not the angle that excites guided waves, the first ultrasonic signal U propagated through the inside of the inspection object 11 is not detected. In this case, since only the second ultrasonic signal S consisting of the diffracted waves received via the outer side of the inspection object 11 is detected, the waveform of only the second ultrasonic signal S as shown in FIG. 7 results. Also, when there is a defect in the inspection object 11, an ultrasonic signal less than the first threshold value is detected at the positions of the two locations shown in FIG. 2, without being detected the first ultrasonic signal U equal to or greater than the first threshold value.

In the inspection method described above, when the first ultrasonic signal U has been detected as being equal to or greater than the first threshold value, the inspection object is determined to be normal, and when not detected, there is determined to be a defect in the inspection object 11, or the transmission and reception direction of the ultrasonic transmission element 6 and the ultrasonic reception element 8 is determined to be not arranged at an angle that excites guided waves in the inspection object 11.

In the ultrasonic inspection method described above, since the ultrasonic transmission element 6 moves in the diameter direction of the cylindrical inspection object 11, at the positions at which the ultrasonic waves transmitted from the ultrasonic transmission element 6 arrive at an angle that excites guided waves with respect to the inspection object 11, it is possible to propagate ultrasonic waves in the circumferential direction within the inspection object 11. Under this condition, the ultrasonic reception element 8, being arranged at a position always opposing the ultrasonic transmission element 6 in a manner sandwiching the inspection object 11, can receive ultrasonic waves from the inspection object 11 at the same angle as the angle of incidence (opposite direction and the same magnitude), and therefore it is possible to inspect the inside of the inspection object 11 by analyzing the received ultrasonic signals. Even if the inspection object 11 having a different diameter is inspected, it is possible to perform ultrasonic inspection without changing the settings.

Therefore, according to the ultrasonic inspection method, even when the sound speed of the material constituting the inspection object 11 is unknown or when the inspection object 11 consists of a laminate material of dissimilar materials, it is possible to eliminate positioning operation for setting the angle of incidence of the ultrasonic waves with respect to the inspection object 11. In addition, since the inspection object 11 is scanned with the ultrasonic transmission element 6 and the ultrasonic reception element 8 being always held with facing each other, even if the inspection object 11 having various diameters is inspected, it is possible to perform the inspection by making ultrasonic waves incident in the inspection object 11 without calculating the angle of incidence.

In particular, by using point focus-type probes as the ultrasonic transmission element 6 and the ultrasonic reception element 8, the ultrasonic transmission element 6 transmits ultrasonic waves at a predetermined constant angle to the inspection object 11, a guided wave is reliably excited in the inspection object 11, and inspection can also be reliably carried out even when the inspection object is a cylinder with a tapered shape.

The transmitted waves propagating through the inside of the inspection object propagate a plurality of cycles in the inside of the inspection object. When the ultrasonic transmission element 6 and the ultrasonic reception element 8 are arranged as shown in FIG. 2, the transmitted waves are received at each circulation through the inside of the inspection object 11, but the transmitted waves that have circulated more than once become mixed with the diffracted waves that are arrived by passing through the outer side of the inspection object 11 (the second ultrasonic signal S) and therefore are difficult to identify. Therefore, in the inspection described above, the defect is determined by the transmitted signal that is initially detected upon propagating through the inside of the inspection object 11.

As described above, not only the transmitted waves that have propagated through the inside of the inspection object 11 but also the diffracted waves that have propagated through the air via the outer side of the inspection object 11 are included in the ultrasonic waves received by the ultrasonic reception element 8.

In the above embodiment, the determination of the transmitted waves (the first ultrasonic signal U) that have propagated through the inside of the inspection object from the diffracted waves (the second ultrasonic signal S) was made utilizing the temporal deviation of the received ultrasonic signals. Since the determination whether or not there is a defect in the inspection object 11 is made depending on whether the intensity of the first ultrasonic signal is greater or less than the predetermined threshold value, it is possible for the ultrasonic reception element 8 to perform the inspection when receiving only the first ultrasonic signal that propagates through the inside of the inspection object 11. In that case, when the received ultrasonic signal is greater than the first threshold value α, the inspection object 11 is determined to be normal, and when the received ultrasonic signal is less than the first threshold value α, the inspection object 11 is determined to have a defect.

In order for the ultrasonic reception element 8 to receive only the first ultrasonic signal U, it is necessary to ensure that the diffracted waves that have propagated through the air via the outer part of the inspection object 11 are not received by the ultrasonic reception element 8.

Figure 10:
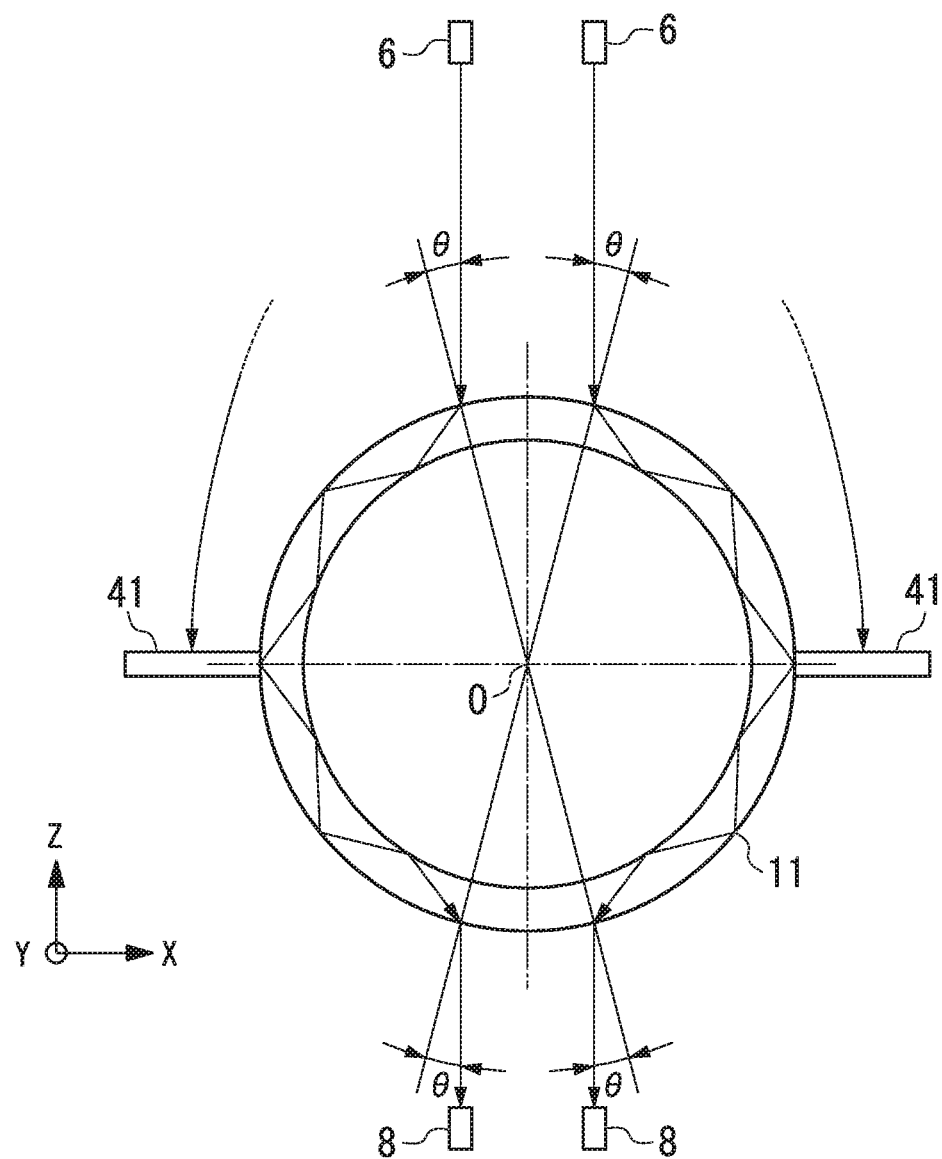
FIG. 10 is a cross-sectional view showing a modification that provides a shield on the outer side of the inspection object, in the ultrasonic inspection method of the first embodiment.

Therefore, as shown in FIG. 10, the ultrasonic inspection is performed with a pair of shields 41 arranged on the outer peripheral surface of the inspection object 11 so as to block the diffracted waves (second ultrasonic signals) from the ultrasonic transmission element 6 from reaching the ultrasonic reception element 8 through the outer side of the inspection object 11. In the example shown in FIG. 10, the block-shaped shields 41, which extends in a direction orthogonal to the opposing direction of the ultrasonic transmission element 6 and the ultrasonic reception element 8, are arranged in a state making contact with the outer peripheral surface of the inspection object 11. As the shields 41, it is possible to use for example acrylic resin or aluminum to prevent the ultrasonic waves from passing.

By performing an ultrasonic inspection in the state with the shields 41 installed, it is possible to effectively detect only the first ultrasonic signal U without the second ultrasonic signal S (refer to FIG. 4) being received by the ultrasonic reception element 8, and, therefore, it is possible to carry out an accurate ultrasonic inspection.

Figure 8:
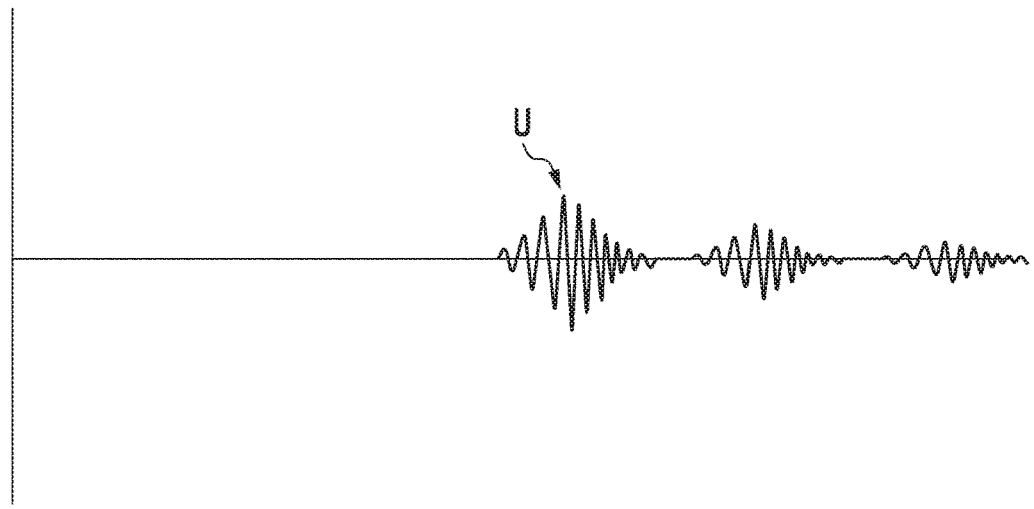
FIG. 8 is a waveform graph that shows the case of receiving only ultrasonic waves consisting of transmitted waves that have propagated through the inside of the inspection object, in the ultrasonic inspection method of the first embodiment.

When performing an ultrasonic inspection using the shields 41, since the diffraction waves (the second ultrasonic signal S) is not received, an ultrasonic signal (the transmitted waves) that propagates by circulating more than once in the inside of the inspection object 11 as shown in FIG. 8 can also be received and made an analysis target. As described above, the transmitted waves propagate in the inside of the inspection object 11 near a half-circumference portion of the inspection object 11 to be received at the ultrasonic reception element 8. In addition, by receiving and analyzing transmitted ultrasonic waves that have propagated nearly one-and-a-half or two-and-half circulations, it is possible to carry out a more precise inspection. When performing an inspection by receiving the transmitted ultrasonic waves that have made more than one circulation in the inspection object 11, even if the transmitted ultrasonic signal is not transmitted and received at both of the ultrasonic transmission elements 6 and the ultrasonic reception elements 8 which located on the left and right sides of the inspection object 11, inspection may be performed just by transmitting and receiving the transmitted ultrasonic signal at either one, and so only a half portion in the diameter direction of the inspection object 11 (right half or left half) need be scanned.

Second Embodiment

Figure 11:
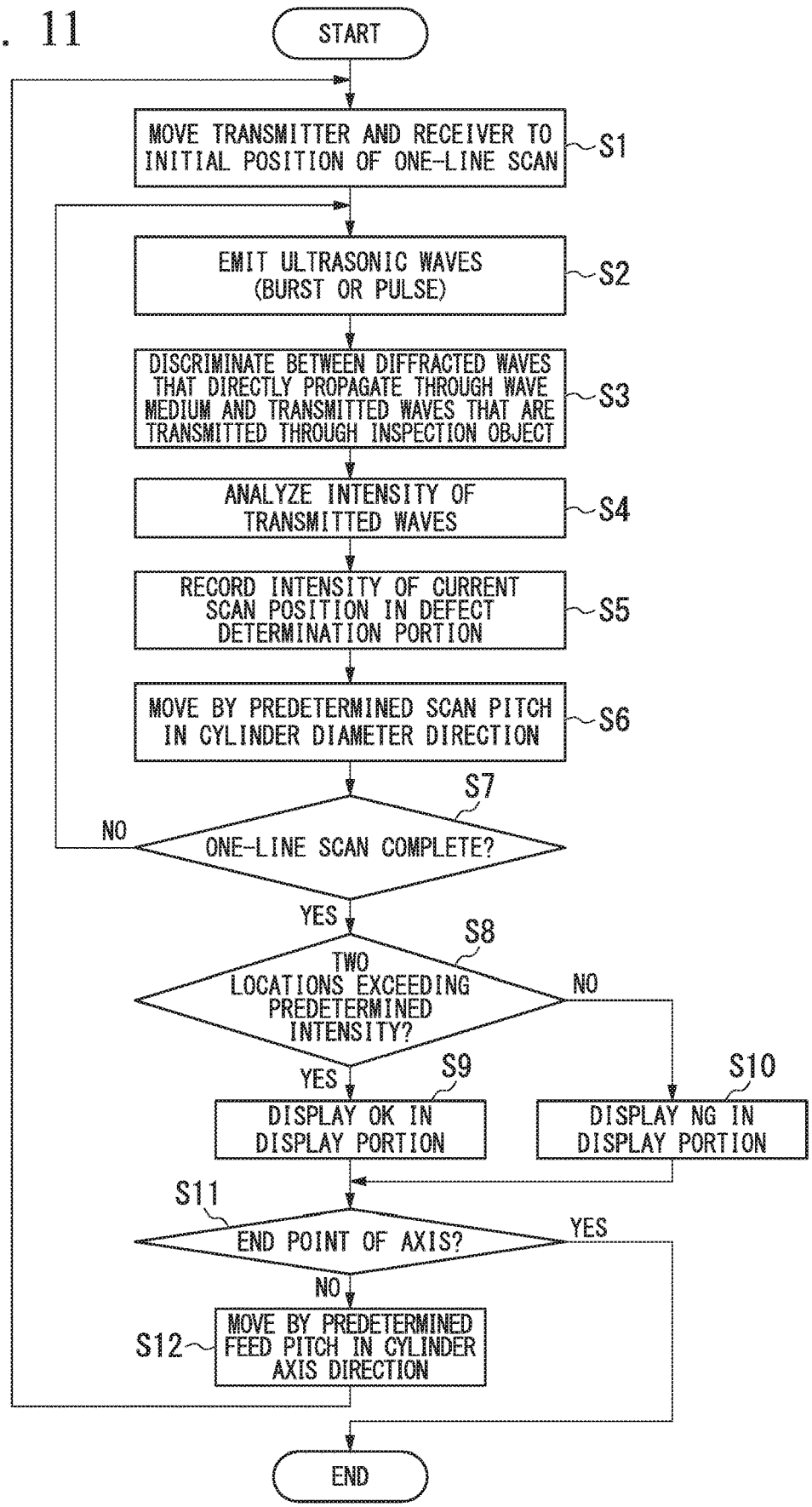
FIG. 11 is a flowchart that shows the ultrasonic inspection method of the second embodiment of the present invention.

In the above ultrasonic inspection according to the first embodiment, inspection is made by scanning a specific transverse position of an inspection object 11 in the diameter direction. When performing an ultrasonic inspection over the entire length of the inspection object 11 in the direction of the cylinder axis of the inspection object 11, the process according to the flowchart shown in FIG. 11 is performed. Portions of the process identical to those of the flowchart of FIG. 3 are given the same reference numerals, with descriptions thereof being omitted (the same being true for the flowchart in FIG. 12 described below).

When performing an ultrasonic inspection of the entire length of the inspection object 11, the process from S1 to S10 is repeated until the end point of the cylinder axis while relatively moving the ultrasonic transmission element 6 and the ultrasonic reception element 8 to the inspection object 11 at a predetermined pitch in the cylinder axis direction (Y direction) of the inspection object 11.

That is, after the process from steps S1 to S10, it is determined whether or not the one-line scan is at the axial end point of the inspection object 11 (S11), and when not determined to be the axial end point, the ultrasonic transmission element 6 and the ultrasonic reception element 8 are moved by a predetermined feeding pitch in the axial direction of the inspection object 11 (S12), and the process from S1 is repeated.

In the flowchart of this FIG. 11, "OK" or "NG" may be displayed in the display unit 33 for each one-line scan. In addition to this, or instead of this, "OK" or "NG" may be displayed in the display unit 33 after inspecting the entire length of the inspection object 11. Alternatively, when the determination in S8 is NO, that is, it is not determined in S8 that there exist two locations exceeding the predetermined intensity in a one-line scan, "NG" is displayed in the display unit 33. However, when the determination in S8 is YES, that is, it is determined that two locations do exist, without displaying "OK" in the display unit 33, the process from S11 onward is performed and the ultrasonic transmission element 6 and the ultrasonic reception element 8 are moved. After inspecting until the axial end point (with the determination of S8 being YES for all the one-line scans), "OK" may then be displayed in the display unit 33.

In FIG. 11, even after "NG" is displayed in the display unit 33 in S10, the inspection object 11 is moved in the axial direction and inspected, but when "NG" is displayed in the display unit 33 in S10 based on the initial one-line scan inspection result, subsequent inspection may be ended.

Third Embodiment

As stated so far, by determining whether or not an ultrasonic signal exceeding a predetermined intensity was detected at two locations in each one-line scan, it is possible to inspect the greater part of the inspection object 11 in the circumferential direction. However, an angle θ of incidence of the ultrasonic waves where the ultrasonic waves transmitted from of the ultrasonic transmission element 6 excites and are converted to the guided waves in the inspection object 11 is greater than 0°. Therefore, in the vicinity of the position at which the ultrasonic waves are incident on the inspection object 11 at the angle of 0° (that is, the angle at which the ultrasonic transmission element 6 is arranged on an extension of the diameter direction of the inspection object 11), the ultrasonic waves from the transmission element 6 are not converted to the guided waves. For that reason, it is not possible to carry out an ultrasonic inspection of this portion.

Therefore, after performing the ultrasonic inspection while scanning in one diameter direction with respect to the inspection object 11 as described above, the inspection object 11 is rotated, for example, 90° about the cylinder axis 0, and then the ultrasonic inspection is performed while again scanning in the diameter direction.

Figure 12:
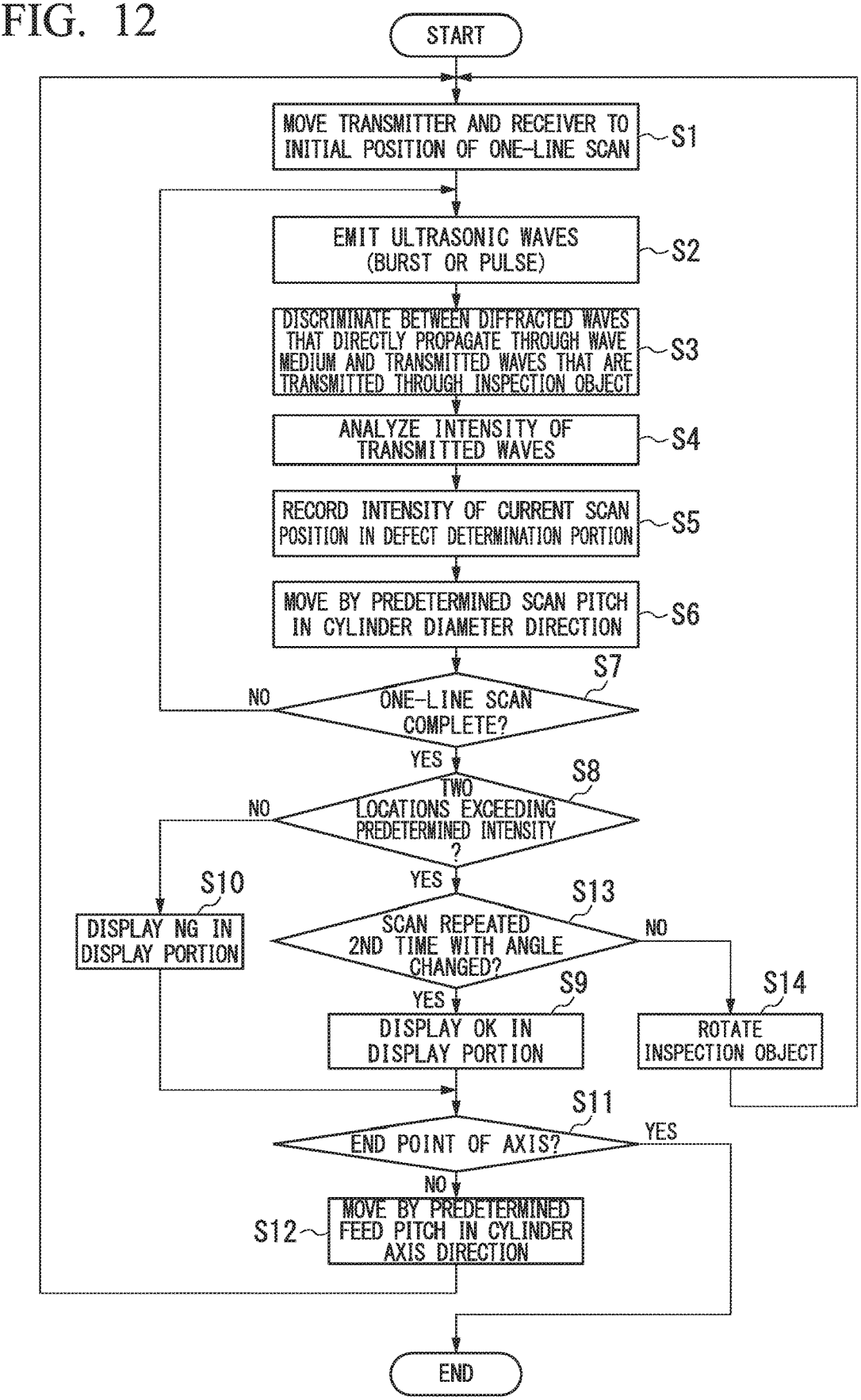
FIG. 12 is a flowchart that shows the ultrasonic inspection method of the third embodiment of the present invention.

Describing by way of the flowchart of FIG. 12, when it has been determined in S8 that there are two locations at which the predetermined intensity is exceeded, it is then determined whether or not the angle has been changed and the line scan repeated a second time (S13). If it is determined that the scan was not repeated a second time, after rotating the inspection object 11, for example, 90° about the cylinder axis (S14), the inspection is carried out again from S1. When it is determined in S13 that the angle was changed and the scan was carried out a second time, "OK" is displayed in the display unit 33. Thereafter, the ultrasonic transmission element 6 and the ultrasonic reception element 8 are moved at a predetermined feeding pitch in the cylinder axis direction of the inspection object 11 (S11), and the process is repeated from S1.

In this way, by performing an ultrasonic inspection of the inspection object 11 such that the inspection object 11 is rotated about the axial center to scan in two different directions in the diameter direction, it is possible to inspect the entire circumference of the inspection object 11.

After performing an ultrasonic inspection of the inspection object 11 at a designated position in the lengthwise direction, the ultrasonic transmission element 6 and the ultrasonic reception element 8 are moved in the lengthwise direction (Y direction) of the inspection object 11, and then the inspection object 11 is scanned in the diameter direction in the same manner as described above. By repeating this operation while moving the ultrasonic transmission element 6 and the ultrasonic reception element 8 little by little in the lengthwise direction (Y direction) of the inspection object 11, it is possible to perform an ultrasonic inspection over the entire length of the inspection object 11.

In FIG. 12, even after "NG" is displayed in the display unit 33 in S10, the inspection object 11 is moved in the axial direction to be inspected, but when "NG" is displayed in the display unit 33 in S10 based on the initial one-line scan inspection result, subsequent inspection may be ended.

Fourth Embodiment

Figure 13:
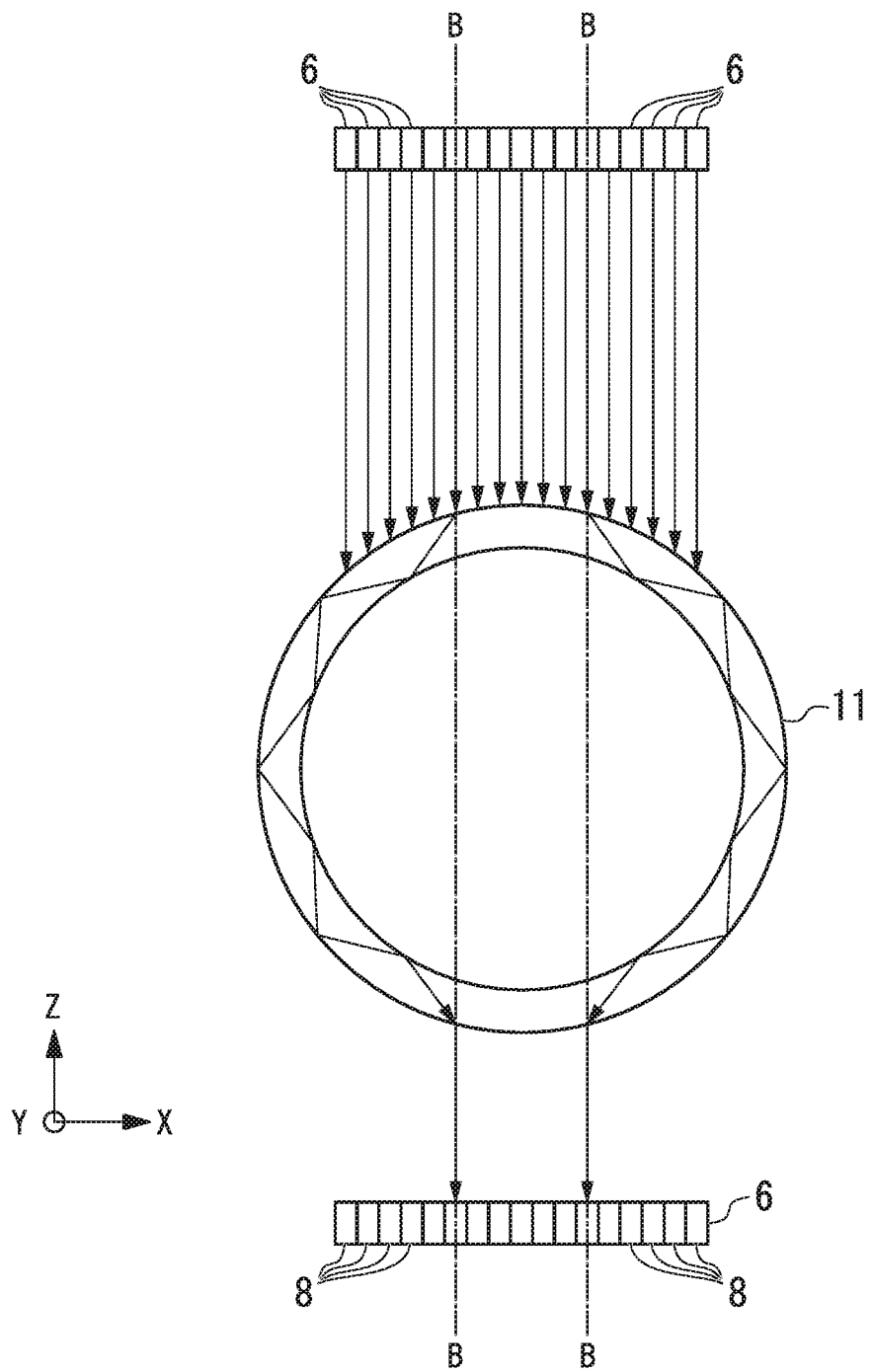
FIG. 13 is a cross-sectional view showing the ultrasonic inspection method of the fourth embodiment of the present invention.

FIG. 13 shows the fourth embodiment of the ultrasonic scan method of the present invention, in which the scan methods of the ultrasonic transmission element 6 and the ultrasonic reception element 8 differ. In the ultrasonic scan method of the first embodiment to the third embodiment, using the ultrasonic transmission element 6 and the ultrasonic reception element 8 that form a set, the ultrasonic transmission element 6 and the ultrasonic reception element 8 are made to move in the diameter direction of the inspection object 11 in an opposed state. In the fourth embodiment, using a plurality of sets of the ultrasonic transmission element 6 and the ultrasonic reception element 8, these are used by being arranged side by side in an array.

That is, the plurality of sets of the ultrasonic transmission element 6 and the ultrasonic reception element 8 are arranged side by side in the diameter direction of the inspection object 11 (X-axis direction), and the ultrasonic transmission element 6 and the ultrasonic reception element 8 of each set are arranged separated on the Z axis, with the inspection object 11 interposed therebetween, and are opposed to each other in the Z-axis direction. In this state, when ultrasonic waves are transmitted from each ultrasonic transmission element 6 to the inspection object 11, the ultrasonic waves from that ultrasonic transmission element 6 whose transmission direction is at an angle exciting guided waves with respect to the inspection object 11 (refer to the angle θ in FIG. 2) are made incident in the inspection object 11, and propagate through the inside of the inspection object 11 as guided waves in the circumferential direction. At this time, since an ultrasonic reception element 8 that opposes the ultrasonic transmission element 6 is set at the same angle in an opposite direction and the same magnitude as the angle of incidence, such ultrasonic reception element 8 can receive ultrasonic waves that have propagated through the inside of the inspection object 11. In the example shown in FIG. 13, at the positions indicated by B-B, the ultrasonic waves transmitted from the ultrasonic transmission elements 6 and propagated through the inside of the inspection object 11 are received by the ultrasonic reception elements 8.

In this ultrasonic transmission method according to the fourth embodiment a plurality of sets of the ultrasonic transmission element 6 and the ultrasonic reception element 8 are arranged side by side in an array parallel to the diameter direction of the inspection object 11, in which ultrasonic waves are transmitted simultaneously or successively from all the ultrasonic transmission elements 6, and the ultrasonic waves that propagated through the inside of the inspection object 11 are received with any of the ultrasonic reception elements 8. That is, among the ultrasonic transmission elements 6 arranged side by side in an array, ultrasonic waves from the ultrasonic transmission element 6 whose transmission direction is at an angle exciting guided waves with respect to the inspection object 11 are made incident on the inside of the inspection object 11 and propagate therethrough as guided waves. Since the reception direction with respect to the inspection object 11 of the ultrasonic reception element 8 opposing that ultrasonic transmission element 6 is set at the angle of opposite direction and the same magnitude as the angle of incidence, the ultrasonic reception element 8 can receive the ultrasonic waves that have propagated through the inspection object 11.

Fifth Embodiment

An ultrasonic inspection method may also consist of arranging a plurality of either one of the ultrasonic transmission element 6 and the ultrasonic reception element 8 side by side in an array in the diameter direction of the inspection object 11 (X direction), arranging one of the other of the ultrasonic transmission element 6 and the ultrasonic reception element 8 at the other side, and performing ultrasonic inspection while moving the latter in the diameter direction of the inspection object 11 (X direction).

Figure 14:
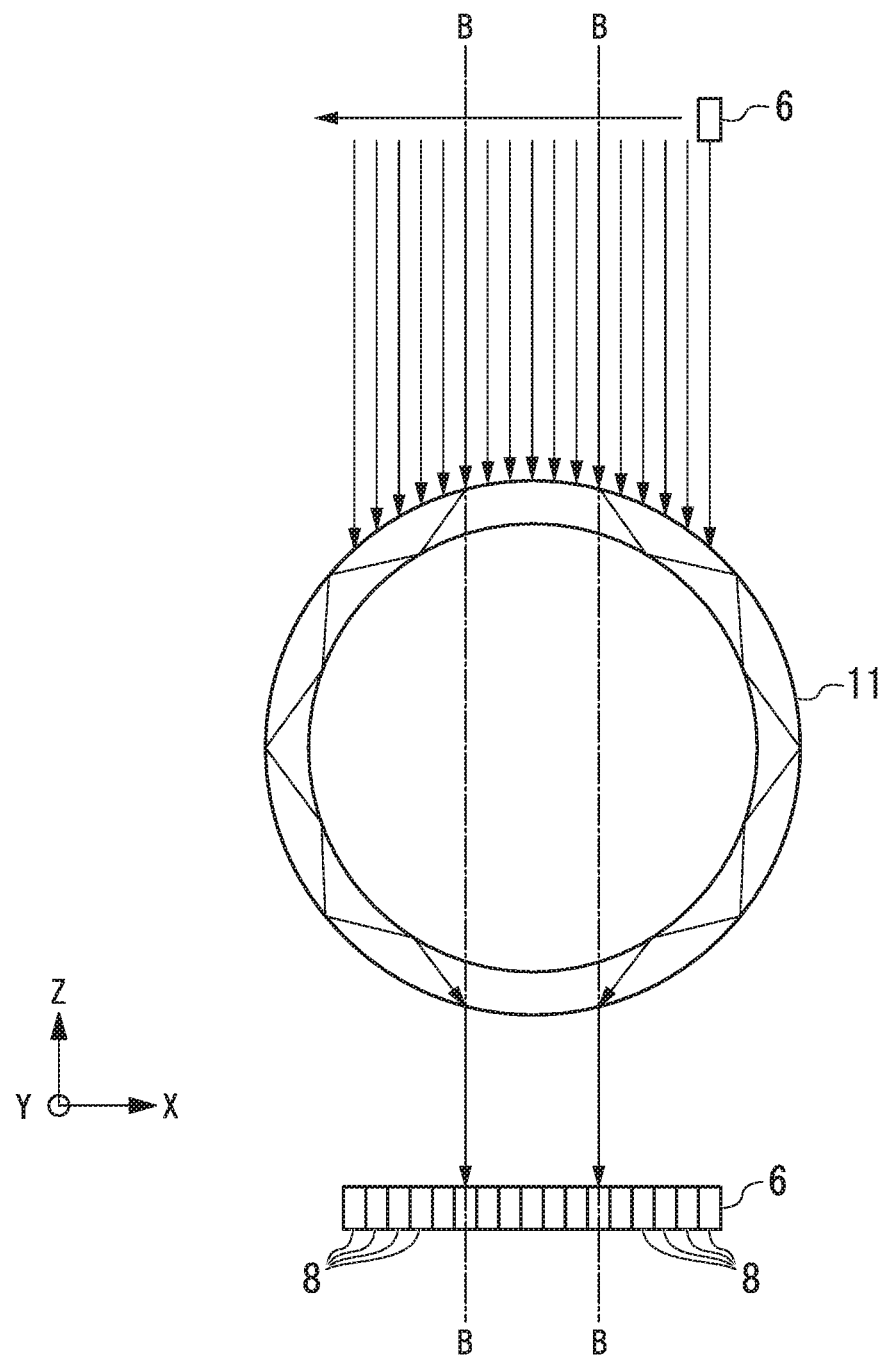
FIG. 14 is a cross-sectional view showing the ultrasonic inspection method of the fifth embodiment of the present invention.

FIG. 14 shows a method that arranges a plurality of the ultrasonic reception elements 8 side by side in an array in the diameter direction of the inspection object 11 (X-axis direction), and performs inspection by transmitting ultrasonic waves while moving the ultrasonic transmission element 6 in the diameter direction (X-axis direction) indicated by the arrow. In this inspection method, when the ultrasonic transmission element 6 is arranged at the position that transmits ultrasonic waves at the angle that excites guided waves in the inspection object 11 (refer to the angle θ in FIG. 2), it is possible to receive the ultrasonic waves (the transmitted waves) that have propagated through the inside of the inspection object 11 by the ultrasonic reception elements 8 that are in the positional relation opposing the position of the ultrasonic transmission element 6, among the ultrasonic reception elements 8 in the array state (the ultrasonic reception elements that are in the opposing relation indicated by B-B in FIG. 14).

In FIG. 14, one ultrasonic transmission element 6 is moved in the diameter direction of the inspection object 11, and a plurality of the ultrasonic reception elements 8 are arranged side by side in the diameter direction of the inspection object 11. Conversely, a method may be adopted that arranges a plurality of the ultrasonic transmission elements 6 side by side in the diameter direction of the inspection object 11, and receives the ultrasonic waves while moving one ultrasonic reception element 8 in the diameter direction of the inspection object 11.

According to the fifth embodiment, either one of the ultrasonic transmission element 6 and the ultrasonic reception element 8 is arranged side by side in an array in the diameter direction of the inspection object 11, and while moving the other in the diameter direction of the inspection object 11, an ultrasonic inspection is performed. It is possible to carry out an ultrasonic inspection of the inspection object 11 when either of the ultrasonic transmission element 6 and the ultrasonic reception element 8 arranged side by side in an array and the ultrasonic transmission element 6 or the ultrasonic reception element 8 that is moving are opposed at an angle that excites guided waves in the inside of the inspection object 11.

Sixth Embodiment

Next, referring to FIG. 15 to FIG. 17, the sixth embodiment of the present invention will be described. In the third embodiment described above, in order to perform an ultrasonic inspection for the portion where ultrasonic waves from the ultrasonic transmission element 6 are incident at an angle of 90° to the inspection object 11, an ultrasonic inspection is performed by rotating the inspection object 11 90° about the cylinder axis and scanning again in the diameter direction.

Figure 15:
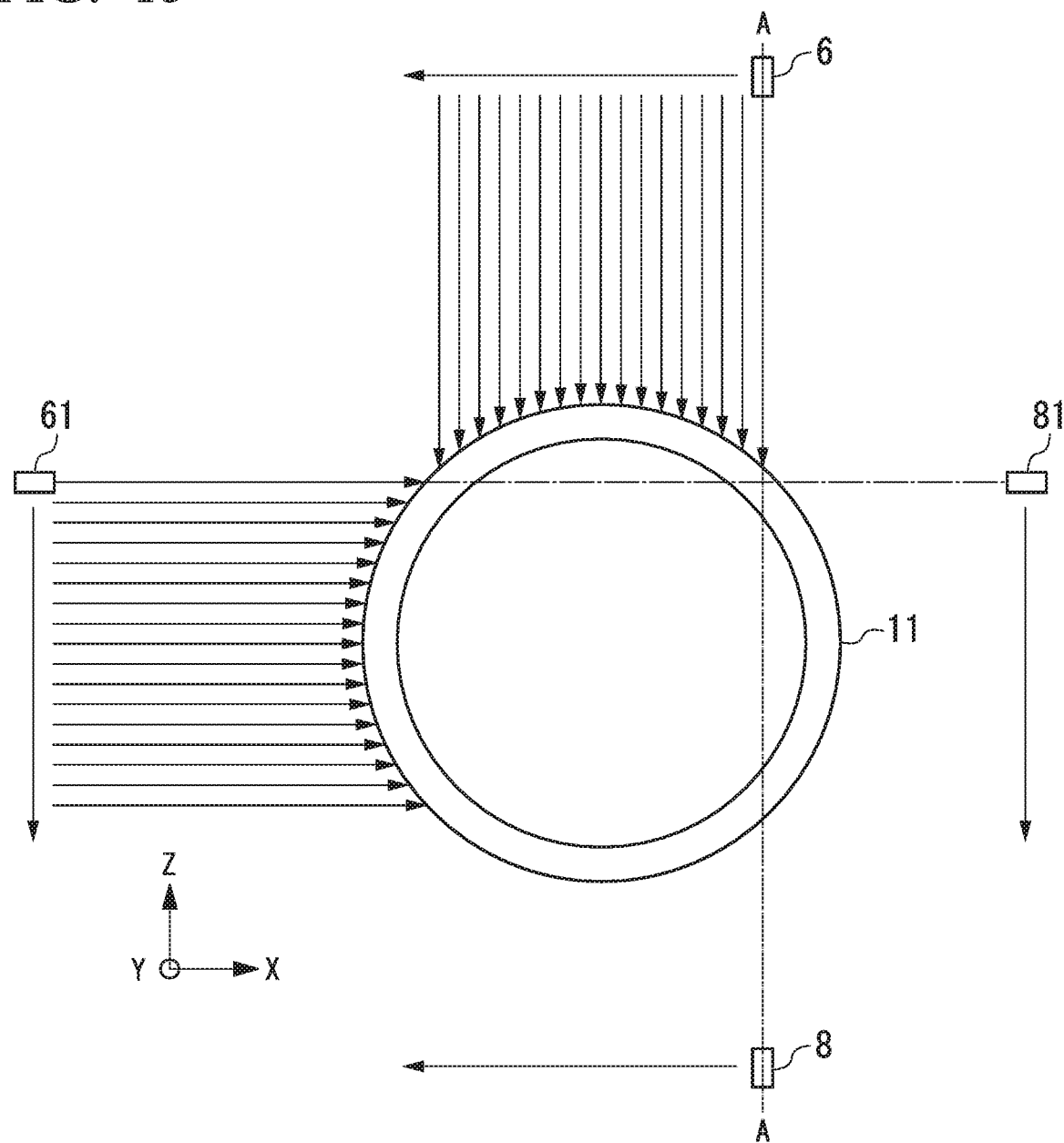
FIG. 15 is a cross-sectional view showing the ultrasonic inspection method of the sixth embodiment of the present invention.
Figure 16:
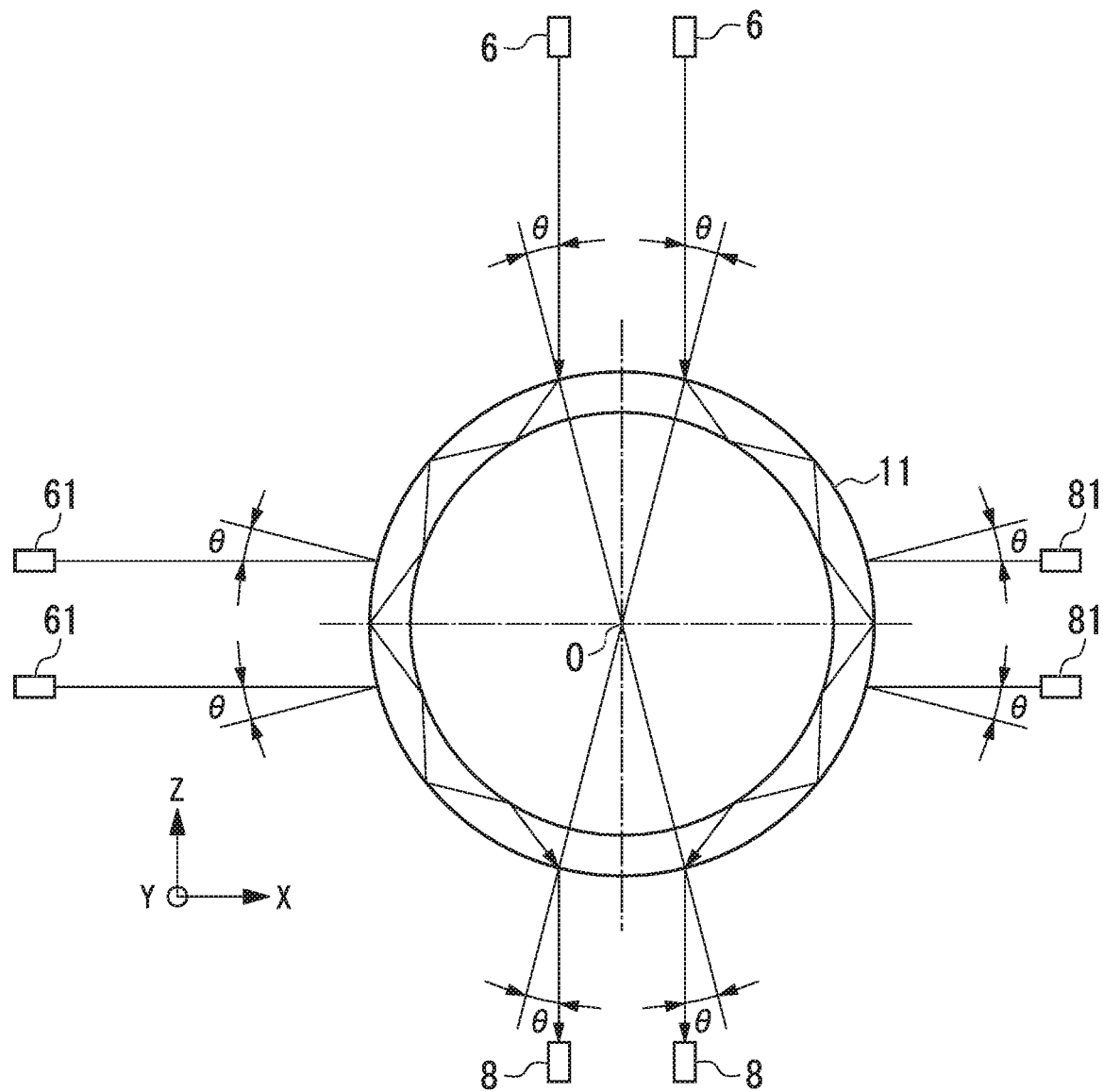
FIG. 16 is a cross-sectional view showing the state of transmitting and receiving ultrasonic waves at an angle that excites guided waves in the ultrasonic inspection method shown in FIG. 15.

In contrast, in the sixth embodiment, as shown in FIG. 15 and FIG. 16, a set of a second ultrasonic transmission element 61 and a second ultrasonic reception element 81 is provided at a position at which the ultrasonic transmission element 6 and the ultrasonic reception element 8 in the third embodiment are rotated 90° about the cylinder axis of the inspection object 11. When the scan in the left direction (X-axis direction) in FIG. 15 of the inspection object 11 is completed by the ultrasonic transmission element 6 and the ultrasonic reception element 8, without rotating the inspection object 11 about the cylinder axis, ultrasonic waves are transmitted from the second ultrasonic transmission element 61 while causing the second ultrasonic transmission element 61 and the second ultrasonic reception element 81 to scan in the direction of the arrows. Thereby, it is possible to perform an ultrasonic inspection of the portion at which an ultrasonic inspection could not be performed by the ultrasonic transmission element 6 and the ultrasonic reception element 8.

That is, as shown in FIG. 16, ultrasonic waves from the second ultrasonic transmission element 61 are incident on the inspection object 11 at angle θ that excites guided waves, transmitted in the inside of the inspection object 11, propagated in the circumferential direction, emitted at the angle θ of opposite direction and the same magnitude, and received by the second ultrasonic reception element 81. The ultrasonic waves that are incident at angle of incidence θ from the second ultrasonic transmission element 61 are received by the second ultrasonic reception element 81 facing the opposite side after having propagated through the inspection object 11 nearly a half circumference portion. The portion of the inspection object 11 at which ultrasonic waves from the ultrasonic transmission element 6 were incident at an angle of 0° is included in the propagation location of these ultrasonic waves. Therefore, it is possible to perform an ultrasonic inspection also for that portion at which an ultrasonic inspection could not be performed by the ultrasonic transmission element 6 and the ultrasonic reception element 8.

Note that in the sixth embodiment, the set of the second ultrasonic transmission element 61 and the second ultrasonic reception element 81 is provided at a position at which the ultrasonic transmission element 6 and the ultrasonic reception element 8 are rotated 90° about the cylinder axis of the inspection object 11. However, the arrangement position of the ultrasonic transmission element 6 and the ultrasonic reception element 8 and the arrangement position of the second ultrasonic transmission element 61 and the second ultrasonic reception element 81 are not limited to positions rotated by an angle of 90° about the cylinder axis of the inspection object 11. This angle may be an arbitrary angle such as 30° or 45°. In addition, although two sets of ultrasonic transmission elements and ultrasonic reception elements were provided, more sets may be provided without being limited to two sets.

Figure 17:
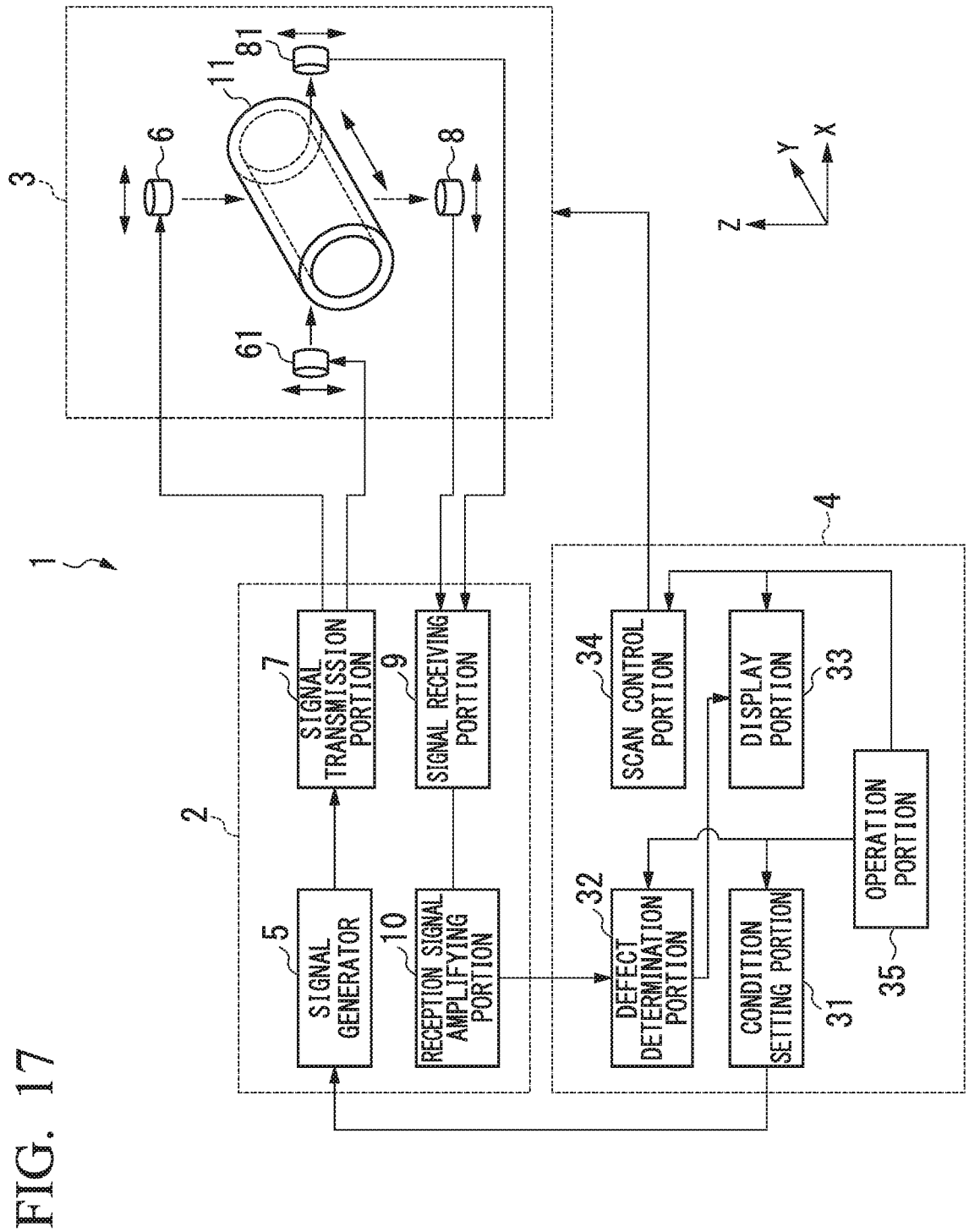
FIG. 17 is a block drawing that shows the ultrasonic inspection device used in the ultrasonic inspection method of the sixth embodiment of the present invention.

The ultrasonic inspection device used in the ultrasonic inspection method of the sixth embodiment is described referring to FIG. 17. In FIG. 17, the same reference numerals are given to the constitutions identical to those of the ultrasonic inspection device shown in FIG. 9, with descriptions thereof being omitted.

Referring to FIG. 17, as stated above, the set of the second ultrasonic transmission element 61 and the second ultrasonic reception element 81 is provided at a position at which the ultrasonic transmission element 6 and the ultrasonic reception element 8 are rotated 90° about the cylinder axis of the inspection object 11. The second ultrasonic transmission element 61 and the second ultrasonic reception element 81 can be driven in the Z-axis direction by the scan control portion 34. The second ultrasonic transmission element 61 is connected to signal transmission portion 7, in the same manner as the ultrasonic transmission element 6. The second ultrasonic transmission element 61 transmits ultrasonic waves to the inspection object 11 by an ultrasonic drive signal transmitted from the signal transmission portion 7. The second ultrasonic reception element 81, similarly to the ultrasonic reception element 8, is connected to the signal receiving portion 9. The second ultrasonic reception element 81, similarly to the ultrasonic reception element 8, receives the ultrasonic waves propagated and transmitted through the inspection object 11, and sends the ultrasonic waves to the signal receiving portion 9 as a received voltage signal. The other operations are identical to those of the ultrasonic inspection device shown in FIG. 9.

When carrying out the inspection method of the sixth embodiment, it is desirable not to receive by the ultrasonic reception element 81 ultrasonic waves (diffracted waves) that have propagated through the air via the outer portion of the inspection object 11 from the ultrasonic transmission element 61, similarly to the ultrasonic inspection method shown in FIG. 10.

Figure 18:
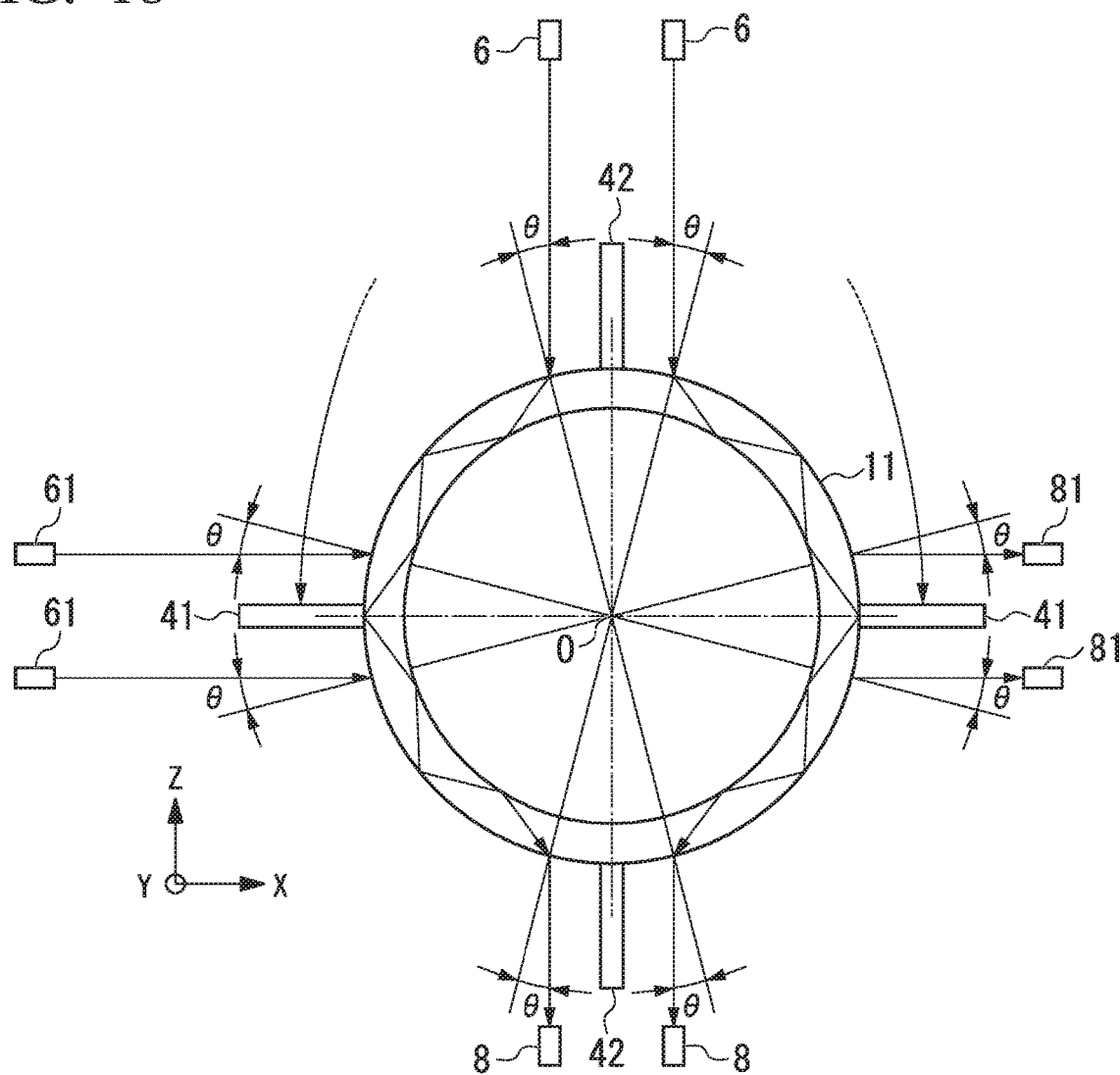
FIG. 18 is a cross-sectional view showing a modification that provides a shield on the outer side of the inspection object, in the ultrasonic inspection method of the sixth embodiment.

Therefore, as shown in FIG. 18, in addition to the shield 41, the ultrasonic inspection is performed by arranging a shield 42 on the outer peripheral surface of the inspection object 11 so as to block ultrasonic signals from the ultrasonic transmission element 61 from reaching the ultrasonic reception element 81. In the example shown in FIG. 18, the block-shaped shield 42, which extends in a direction orthogonal to the opposing direction of the ultrasonic transmission element 61 and the ultrasonic reception element 81, is arranged at a position rotated 90° from the shield 41 in a state making contact with the outer peripheral surface of the inspection object 11. As the shield 42, it is possible to use for example acrylic resin or aluminum, similarly to the shield 41.

By performing an ultrasonic inspection in the state with this shield 42 installed, it is possible to effectively detect only the first ultrasonic signal U without the aforementioned second ultrasonic signal S (refer to FIG. 4) being received at the ultrasonic reception element 81, and so it is possible to carry out an accurate ultrasonic inspection.

Seventh Embodiment

Figure 19:
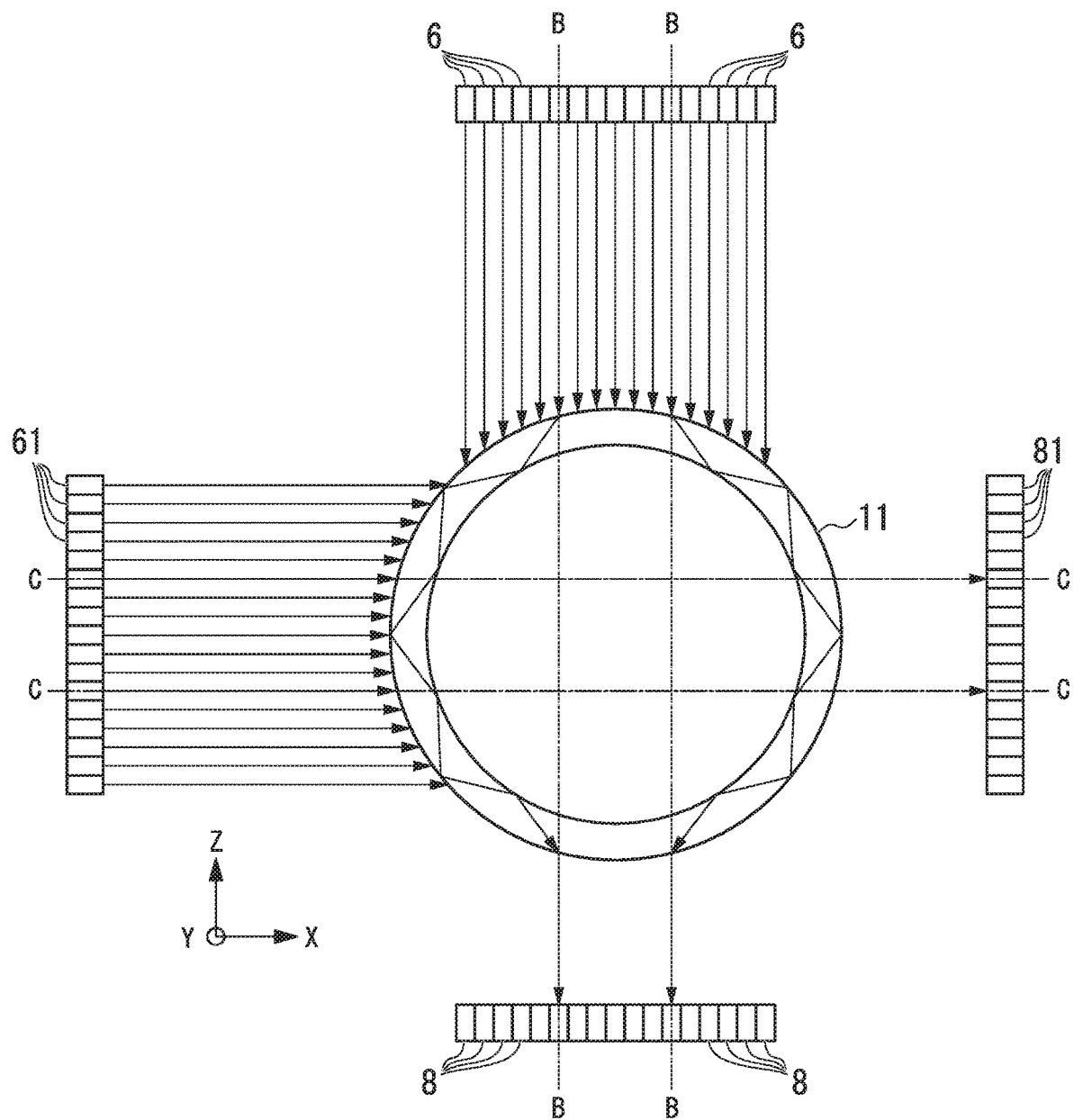
FIG. 19 is a cross-sectional view showing the ultrasonic inspection method of the seventh embodiment of the present invention.

Referring to FIG. 19, the ultrasonic inspection method of the seventh embodiment of the present invention will be described. In the fourth embodiment described above, a plurality of sets of the ultrasonic transmission element 6 and the ultrasonic reception element 8 were used in a manner arranged side by side in an array, as shown in FIG. 13. In the seventh embodiment, in addition to the constitution of the fourth embodiment, a plurality of sets of the second ultrasonic transmission element 61 and the second ultrasonic reception element 81 are used in a manner arranged side by side in an array.

That is, in addition to the constitution of FIG. 4, the plurality of sets of the ultrasonic transmission element 61 and the ultrasonic reception element 81 are arranged side by side in the diameter direction of the inspection object 11, and the ultrasonic transmission element 61 and the ultrasonic reception element 81 of each set are arranged separated on the X axis, with the inspection object 11 interposed therebetween, and are opposed to each other in the X-axis direction. That is, in the seventh embodiment, the ultrasonic transmission element 61 and the ultrasonic reception element 81 of the plurality of sets are arranged at a position at which the ultrasonic transmission element 6 and the ultrasonic reception element 8 of the plurality of sets are rotated 90° about the cylinder axis of the inspection object 11.

In this state, when ultrasonic waves are transmitted from each ultrasonic transmission element 61 to the inspection object 11, the ultrasonic waves from the ultrasonic transmission element 61 whose transmission direction is at the angle of exciting guided waves with respect to the inspection object 11 (refer to the angle θ in FIG. 16) are made incident in the inspection object 11, and propagate through the inside of the inspection object 11 as guided waves in the circumferential direction. At this time, since the ultrasonic reception element 81 that opposes the ultrasonic transmission element 61 is also set at the opposite angle of the same magnitude as the angle of incidence, the ultrasonic reception element 81 can receive the ultrasonic waves that have propagated through the inside of the inspection object 11 and have been emitted therefrom. In the example shown in FIG. 19, at the positions indicated by C-C, the ultrasonic waves transmitted from the ultrasonic transmission element 61 and propagated through the inside of the inspection object 11 are received by the ultrasonic reception element 81.

Note that in the seventh embodiment, the plurality of sets of the second ultrasonic transmission element 61 and the second ultrasonic reception element 81 are provided at positions at which the plurality of sets of the ultrasonic transmission element 6 and the ultrasonic reception element 8 are rotated 90° about the cylinder axis of the inspection object 11. However, the arrangement positions of the plurality of sets of the ultrasonic transmission element 6 and the ultrasonic reception element 8 and the arrangement positions of the plurality of sets of the second ultrasonic transmission element 61 and the second ultrasonic reception element 81 are not limited to positions rotated by an angle of 90° about the cylinder axis of the inspection object 11. This angle may be an arbitrary angle such as 30° or 45°. In addition, although a plurality of sets of transmission elements and ultrasonic reception elements were provided, more sets may be provided without being limited to two sets.

Eighth Embodiment

Figure 20:
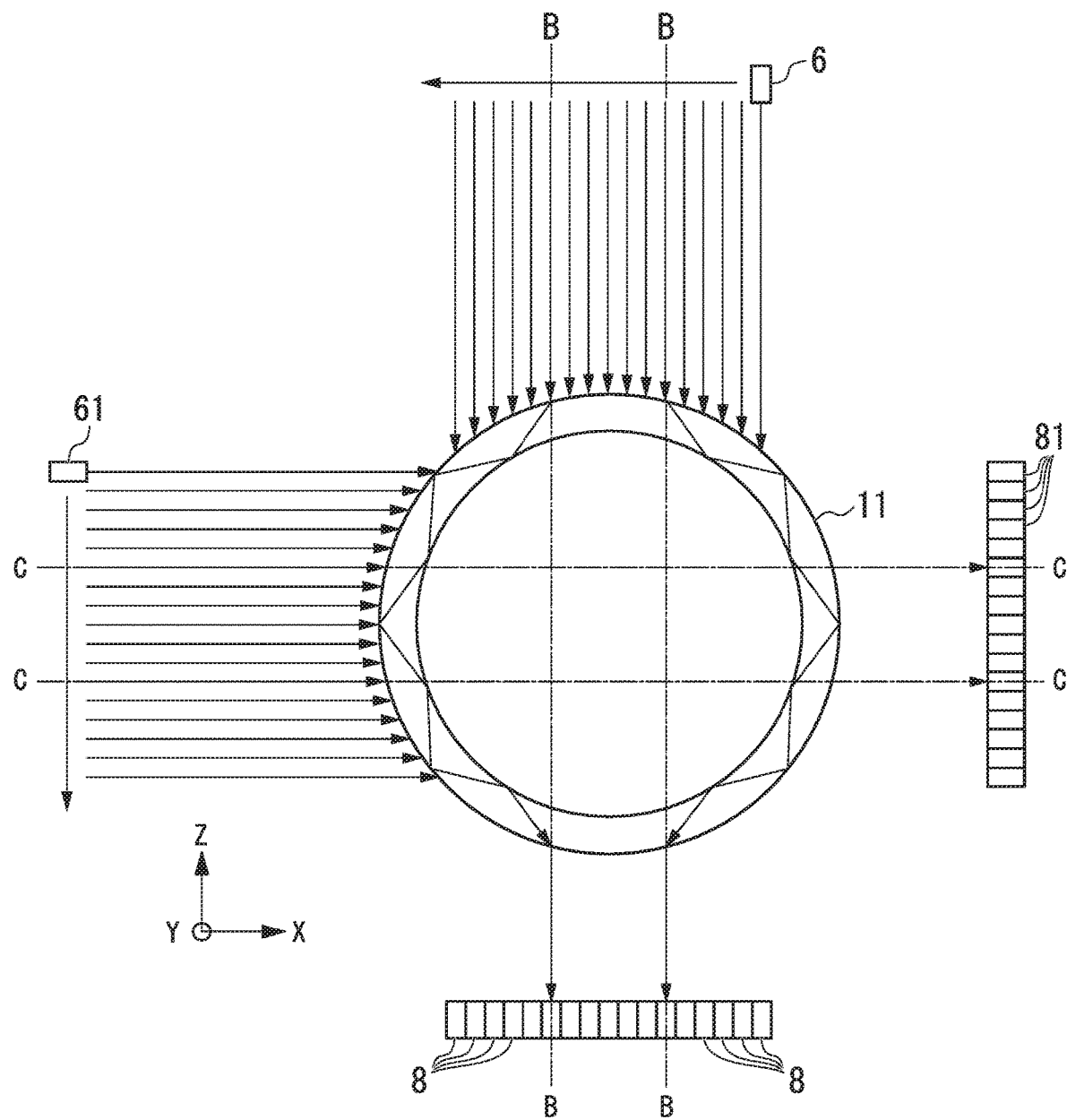
FIG. 20 is a cross-sectional view showing the ultrasonic inspection method of the eighth embodiment of the present invention.

Referring to FIG. 20, the ultrasonic inspection method of the eighth embodiment of the present invention will be described. In the fifth embodiment described above, as shown in FIG. 14, a plurality of the ultrasonic reception elements 8 are arranged side by side in an array in the diameter direction (X-axis direction) of the inspection object 11, with the inspection performed by transmitting ultrasonic waves while moving the ultrasonic transmission element 6 in the diameter direction (X-axis direction) indicated by the arrow. In the eighth embodiment, in addition to the constitution of the fifth embodiment, a plurality of the ultrasonic reception elements 81 are arranged side by side in an array in the diameter direction of the Z-axis direction of the inspection object 11, with the inspection performed by transmitting ultrasonic waves while moving the ultrasonic transmission element 61 in the Z-axis direction indicated by the arrow. That is, in the eighth embodiment, the ultrasonic transmission element 61 and the plurality of ultrasonic reception elements 81 are arranged at positions at which the ultrasonic transmission element 6 and the plurality of ultrasonic reception elements 8 are rotated 90° about the cylinder axis of the inspection object 11.

In this inspection method, when the ultrasonic transmission element 61 is arranged at a position of transmitting ultrasonic waves at an angle exciting guided saves with respect to the inspection object 11 (refer to the angle θ in FIG. 16), it is possible to receive the ultrasonic waves that have propagated through the inside of the inspection object 11 by the ultrasonic reception elements 81 that are in the positional relation opposing the position of the ultrasonic transmission element 61, among the ultrasonic reception elements 81 in the array state (the ultrasonic reception elements that are in the opposing relation indicated by C-C in FIG. 20).

In the eighth embodiment, one ultrasonic transmission element 61 is moved in the Z-axis direction diameter direction of the inspection object 11, and a plurality of the ultrasonic reception elements 8 are arranged side by side in the Z-axis direction diameter direction of the inspection object 11. However, conversely, a method may be adopted that arranges a plurality of the ultrasonic transmission elements 61 side by side in the Z-axis direction diameter direction of the inspection object 11, and receives ultrasonic waves while moving one ultrasonic reception element 81 in the Z-axis direction diameter direction of the inspection object 11.

In the eighth embodiment, the set of one ultrasonic transmission element 61 and a plurality of the ultrasonic reception elements 81 were provided at positions at which the ultrasonic transmission element 6 and the plurality of ultrasonic reception elements 8 are rotated 90° about the cylinder axis of the inspection object 11. However, the arrangement position of the set of the one ultrasonic transmission element 6 and the plurality of ultrasonic reception elements 8 and the arrangement position of the set of the one ultrasonic transmission element 61 and the plurality of ultrasonic reception elements 81 are not limited to positions rotated by an angle of 90° about the cylinder axis of the inspection object 11. This angle may be an arbitrary angle such as 30° or 45°. In addition, although two sets of ultrasonic transmission elements and ultrasonic reception elements were provided, more sets may be provided without being limited to two sets.

The present invention is not limited to the above embodiments, and it is possible to add various changes in a scope that does not depart from the gist of the present invention.

For example, in the embodiments, the first ultrasonic signal U and the second ultrasonic signal S were distinguished by focusing on the intensity (amplitude) of the received ultrasonic signal, but the first ultrasonic signal U and the second ultrasonic signal S may also be distinguished by focusing on a frequency characteristic. In this case, a frequency analysis may be conducted to select a specific frequency among two peaks, or to select the peak with the weaker intensity since diffracted waves have an extremely strong intensity.

In the embodiments, descriptions were given of the ultrasonic transmission element and/or the ultrasonic reception element being moved in the X direction and Y direction, but the inspection object may be moved in the X direction and Y direction.

Moreover, in the above embodiments, the example was given of the inspection object 11 having a cylindrical shape. However, provided that the shape of the inspection object is cylindrical, the cross section orthogonal to the cylinder axis may have an elliptical shape.

When causing an inspection object whose cross section is an ellipsoid to be scanned with the ultrasonic transmission element 6 or the ultrasonic reception element 8, the ultrasonic transmission element 6 or the ultrasonic reception element 8 may only be made to scan in parallel with the long axis or the short axis of the ellipsoid. When the cross section of the inspection object is an ellipsoid, and the ultrasonic transmission element 6 or the ultrasonic reception element 8 are arranged in a plurality side by side, the plurality of ultrasonic transmission elements 6 or ultrasonic reception elements 8 may only be provided parallel to the long axis or the short axis of the elliptical shape of the cross section of the inspection object. Accordingly, in the present specification, the word "cylindrical" includes not only a cylindrical tube but also an elliptical tube.

The present invention can be applied to internal inspection by ultrasound of an inspection object having a cylindrical shape, can eliminate the troublesome work of positioning the angle of incidence with respect to a cylindrical inspection object, and can easily inspect for defects of the inspection object even when the sound speed data of the material of the inspection object is unknown or the inspection object consists of a laminate material.

What is claimed is:

1. An ultrasonic inspection method for inspecting an inspection object, the method comprising:
    arranging an ultrasonic transmission element and an ultrasonic reception element to face each other;
    transmitting ultrasonic waves from the ultrasonic transmission element;
    receiving by the ultrasonic reception element the ultrasonic waves transmitted from the ultrasonic transmission element to generate an ultrasonic signal;
    distinguishing between a first ultrasonic signal and a second ultrasonic signal included in the ultrasonic signal in a time domain, the first ultrasonic signal representing a transmitted wave that has propagated through an inside of the inspection object and the second ultrasonic signal representing a diffracted wave that has propagated through a space outside the inspection object, by (i) comparing an intensity of the ultrasonic signal generated by the reception element with a first threshold value, (ii) comparing the intensity of the ultrasonic signal generated by the reception element with a second threshold value which is greater than the first threshold value in a case in which the intensity of the ultrasonic signal is equal to or greater than the first threshold value, and (iii) determining the ultrasonic signal as the second ultrasonic signal in case in which the ultrasonic signal is equal to or greater than the second threshold value; and
    inspecting the inspection object on a basis of whether the first ultrasonic signal having the intensity equal to or greater than the first threshold value has been detected before detecting the second ultrasonic signal.

2. The ultrasonic inspection method according to claim 1, further comprising:
    setting a time window at a time period earlier than a time when the diffracted wave is received by the ultrasonic reception element, wherein the distinguishing between the first ultrasonic signal and the second ultrasonic signal included in the ultrasonic signal is performed by determining the ultrasonic signal falling in the time window as the first ultrasonic signal.

3. The ultrasonic inspection method according to claim 1, wherein, in the case in which the first ultrasonic signal having the intensity equal to or greater than the first threshold value has been detected before detecting the second ultrasonic signal, the inspection object is determined to be normal.

4. The ultrasonic inspection method according to claim 1, wherein, in the case in which the first ultrasonic signal having the intensity equal to or greater than the first threshold value is not detected, the inspection object is determined to have a defect.

* * * * *